United States Patent
Du et al.

(10) Patent No.: US 12,477,579 B2
(45) Date of Patent: Nov. 18, 2025

(54) WIRELESS LOCAL AREA NETWORK SENSING METHOD, NETWORK DEVICE, AND CHIP

(71) Applicant: HUAWEI TECHNOLOGIES CO., LTD., Shenzhen (CN)

(72) Inventors: Rui Du, Shenzhen (CN); Xiao Han, Shenzhen (CN); Chenchen Liu, Shenzhen (CN); Meihong Zhang, Shenzhen (CN); Yingxiang Sun, Shenzhen (CN); Danny Kai Pin Tan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 605 days.

(21) Appl. No.: 17/949,453

(22) Filed: Sep. 21, 2022

(65) Prior Publication Data

US 2023/0018459 A1 Jan. 19, 2023

Related U.S. Application Data

(63) Continuation of application No. PCT/CN2021/083469, filed on Mar. 27, 2021.

(30) Foreign Application Priority Data

Mar. 27, 2020 (CN) .......................... 202010231642.8

(51) Int. Cl.
*H04W 74/00* (2009.01)
*H04B 7/0452* (2017.01)
(Continued)

(52) U.S. Cl.
CPC ...... *H04W 74/0816* (2013.01); *H04B 7/0452* (2013.01); *H04W 74/0866* (2013.01)

(58) Field of Classification Search
None
See application file for complete search history.

(56) References Cited

U.S. PATENT DOCUMENTS

| 11,750,251 B2 | 9/2023 | Lou et al. |
| 2006/0271658 A1 | 11/2006 | Beliles, Jr. et al. |

(Continued)

FOREIGN PATENT DOCUMENTS

| CN | 103024807 A | 4/2013 |
| CN | 104205985 A | 12/2014 |

(Continued)

OTHER PUBLICATIONS

IEEE P802.11ax/D6.0, "Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN", Nov. 2019, 780 pages.

(Continued)

*Primary Examiner* — Gerald A Smarth
(74) *Attorney, Agent, or Firm* — Maier & Maier, PLLC

(57) ABSTRACT

A wireless local area network sensing method. The method includes: in a process in which a second network device performs high frequency MIMO channel access, a first network device sends indication information to a plurality of second network devices, where the indication information indicates the plurality of second network devices to send uplink sensing signals; and the first network device receives the uplink sensing signals from the second network devices and performs uplink sensing based on the uplink sensing signals.

20 Claims, 11 Drawing Sheets

(51) Int. Cl.
*H04W 74/08* (2009.01)
*H04W 74/0816* (2024.01)

(56) References Cited

U.S. PATENT DOCUMENTS

| | | | |
|---|---|---|---|
| 2008/0212701 | A1 | 9/2008 | Pan et al. |
| 2017/0127386 | A1 | 5/2017 | Kasher et al. |
| 2017/0201298 | A1 | 7/2017 | Cariou et al. |
| 2017/0332277 | A1 | 11/2017 | Xin et al. |
| 2019/0261417 | A1 | 8/2019 | Chen et al. |
| 2019/0386714 | A1 | 12/2019 | Yang et al. |
| 2020/0067577 | A1 | 2/2020 | Lou et al. |
| 2020/0104326 | A1* | 4/2020 | Ricci .............. G06Q 30/012 |
| 2020/0162135 | A1* | 5/2020 | Sun .................. H04B 7/0695 |
| 2021/0007006 | A1* | 1/2021 | Chen ................ H04L 1/1887 |
| 2022/0166470 | A1 | 5/2022 | Sun et al. |
| 2023/0018459 | A1 | 1/2023 | Du et al. |

FOREIGN PATENT DOCUMENTS

| | | |
|---|---|---|
| CN | 106664165 A | 5/2017 |
| CN | 107396443 A | 11/2017 |
| CN | 107623954 A | 1/2018 |
| CN | 109151999 A | 1/2019 |
| EP | 3200497 A1 | 8/2017 |
| WO | 2017184216 A1 | 10/2017 |
| WO | 2018085677 A1 | 5/2018 |

OTHER PUBLICATIONS

IEEE Std 802.11-2016, "IEEE Standard for Information technology—Telecommunications and information exchange between systems Local and metropolitan area networks—Specific requirements, Part 11: Wireless LAN Medium Access Control (MAC) and Physical Layer (PHY) Specifications", Approved Dec. 7, 2016, 3534 pages.

IEEE P802.11ay/D2.0, "Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications-, Amendment 7: Enhanced throughput for operation in license-exempt bands above 45 GHz", Jul. 2018, 673 pages.

"P802.11ay TM/D1.0, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced Throughput for Operation in License-Exempt Bands Above 45 GHz", IEEE P802.11ay TM/D1.0, the Institute of Electrical and Electronics Engineers, Inc., Nov. 2017, 490 pages.

Intel, "Updates of Solution 1 with Alternative UP Convergence Method and Evaluation Procedure", 3GPP, SA WG2 TD, Jul. 2-6, 2018, 7 pages.

3GPP TR 23.793 v0.6.0, 3rd Generation Partnership Project; Technical Specification Group Services and System Aspects; Study on Access Traffic Steering, Switching and Splitting Support in the 5G System Architecture (Release 16), Jul. 2018, 80 pages.

\* cited by examiner

WIRELESS LOCAL AREA NETWORK SENSING METHOD, NETWORK DEVICE, AND CHIP

CROSS-REFERENCE TO RELATED APPLICATIONS

This application is a continuation of International Application No. PCT/CN2021/083469, filed on Mar. 27, 2021, which claims priority to Chinese Patent Application No. 202010231642.8, filed on Mar. 27, 2020. The disclosure of the aforementioned applications are hereby incorporated by reference in their entireties.

TECHNICAL FIELD

The embodiments relate to the field of communication technologies, a wireless local area network sensing method, a network device, and a chip.

BACKGROUND

As a current mainstream technology of wireless communication, the wireless local area network (WLAN) technology has been seen in every aspect of social production, commercial activities, and daily life. Widely distributed WLAN devices not only greatly facilitate data information transmission, but also are suitable to be used as sensing infrastructure. A wireless signal is reflected by a surrounding object and reaches a receiver during propagation. The receiver parses a physical feature of the wireless signal to determine a location, speed, and orientation of the surrounding object.

Wireless local area network sensing (WLAN Sensing) is used for passive target sensing within a WLAN range. Different from target sensing in 11az, a sensed target in WLAN sensing does not need to carry any device (device free). Related technologies may be widely applied to scenarios such as intrusion detection, motion recognition, and breathing/heartbeat detection, and have great commercial value.

According to a quantity of measurement nodes and a quantity of transmitting nodes, an actual scenario may be classified into a scenario with multiple measurement nodes and a scenario with multiple transmitting nodes. In an existing 802.11 standard, a low frequency standard (such as 802.11ax) may support functions of downlink multi-user multiple-input multiple-output (DL MU MIMO) and uplink multi-user multiple-input multiple-output (UL MU MIMO). However, a high frequency standard (such as 802.11 ay) does not support an uplink multi-user multiple-input multiple-output function. Therefore, how to implement an uplink multi-user wireless local area network sensing function in a high frequency scenario is a major problem to be resolved.

SUMMARY

To resolve the foregoing problem, the embodiments may include a wireless local area network sensing method, a network device, a chip system, a computer-readable storage medium, a computer product, and the like.

According to a first aspect, the embodiment may provide an uplink multi-user wireless local area network sensing method, including: In a process in which a second network device performs high frequency multiple-input multiple-output (MIMO) channel access, a first network device sends indication information to the second network device, where the indication information indicates a plurality of second network devices to send uplink sensing signals; and the first network device receives the uplink sensing signal sent by the second network device, and performs uplink sensing based on the uplink sensing signal.

It can be understood that the method provided in the first aspect is based on the process of high frequency multi-user MIMO channel access and improves the process, resolves a failure of high efficiency uplink multi-user (UL MU) sensing in high frequency sensing, and implements a function that multiple users simultaneously perform sensing (also referred to as lighting) in uplink.

In an implementation, the first network device sends a request to send (RTS) frame to the second network device. The indication information is carried in control information corresponding to the RTS frame, and the indication information indicates the second network device to send the uplink sensing signal.

In an implementation, the first network device may alternatively send a directional multi-gigabit clear to send to self (DMG CTS-to-self) frame to the second network device. The indication information is carried in control information corresponding to the DMG CTS-to-self frame, and the indication information indicates the second network device to send the uplink sensing signal.

In an implementation, the control information is in a control trailer (CT). A predefined bit in the CT may be used to carry the indication information, and the predefined bit may be a reserved bit in an existing standard. In this implementation, a reserved bit in the CT may be used to indicate information sent to the second network device, without adding new bits. This may reduce indication overheads.

In an implementation, the predefined bit includes a field, for example, a sensing indication field, a waveform or sequence set identifier field, and a direction identifier field.

In an implementation, the predefined bit may further include an optional field, for example, a waveform or sequence identifier field, or a repetition field.

In an implementation, a waveform or sequence set indicated by the waveform or sequence set identifier field includes a waveform or sequence indicated by the waveform or sequence identifier field.

According to a second aspect, the embodiment may further provide an uplink multi-user wireless local area network sensing method, including: A second network device receives indication information sent by the first network device in a MIMO channel access process in a high frequency scenario, where the indication information indicates the second network device to send an uplink sensing signal; and the second network device sends the uplink sensing signal based on the indication information.

It can be understood that the method provided in the second aspect is based on the process of high frequency multi-user MIMO channel access and improves the process, resolves a failure of high efficiency UL MU sensing in high frequency sensing, and implements a function that multiple users simultaneously perform lighting in uplink.

In an implementation, after receiving the indication information, the second network device sends a directional multi-gigabit clear to send (DMG CTS) frame after a short inter frame space (SIFS) for channel protection, and then sends a corresponding uplink sensing signal based on the indication information. The sensing signal is a waveform or sequence with orthogonality. It can be understood that the DMG CTS frame in this implementation may protect a channel and mute a surrounding hidden node. This ensures smooth sensing.

In an implementation, after receiving the indication information, the second network device may alternatively send a corresponding uplink sensing signal directly based on the indication information after an SIFS. The sensing signal is a waveform or sequence with orthogonality and has good sensing performance.

In an implementation, the second network device receives a request to send (RTS) frame sent by the first network device. The indication information is carried in control information corresponding to the RTS frame, and the indication information indicates the second network device to send the uplink sensing signal.

In an implementation, the second network device may further receive a directional multi-gigabit clear to send to self (DMG CTS-to-self) frame sent by the first network device. The indication information is carried in control information corresponding to the DMG CTS-to-self frame, and the indication information indicates the second network device to send the uplink sensing signal.

In an implementation, the control information is in a control trailer (CT). A predefined bit in the CT may be used to carry the indication information and the predefined bit may be a reserved bit in an existing standard. In this implementation, a reserved bit in an existing CT may be used to indicate information sent to the second network device, without adding new bits. This may reduce indication overheads.

In an implementation, the predefined bit includes a field, for example, a sensing indication field, a waveform or sequence set identifier field, and a direction identifier field.

In an implementation, the predefined bit may further include an optional field, for example, a waveform or sequence identifier field, or a repetition field.

In an implementation, a waveform or sequence set indicated by the waveform or sequence set identifier field includes a waveform or sequence indicated by the waveform or sequence identifier field.

According to a third aspect, the embodiment may further provide a multi-user wireless local area network sensing method, including: A first network device sends indication information to a plurality of second network devices working at a high frequency, where the indication information indicates the plurality of second network devices to send sensing signals, and the indication information is carried in control information corresponding to a frame sent by the first network device to the second network device; and the first network device receives the sensing signal sent by the second network device and performs sensing.

In an implementation, the sensing signal is an uplink sensing signal.

In another implementation, the sensing signal is a downlink sensing signal.

In an implementation, the frame is a frame carrying a control trailer (frame ended with CT). The CT may be of a predefined sensing type. In this implementation, a newly defined CT type may be obtained by modifying a reserved bit in an existing CT of another type. The CT type may be used to carry information that indicates the second network device to send a signal for high frequency sensing, and high frequency sensing does not need to be based on an MU MIMO channel access process. This indication manner is more flexible. In addition, an existing reserved bit is used in this manner, without adding new bits. Therefore, indication overheads are not increased.

In an implementation, the newly defined CT frame includes a field, for example, a sensing indication field, a waveform or sequence set identifier field, and a direction identifier field.

In an implementation, the newly defined CT frame may further include an optional field, for example, a waveform or sequence identifier field, or a repetition field.

In an implementation, a waveform or sequence set indicated by the waveform or sequence set identifier field includes a waveform or sequence indicated by the waveform or sequence identifier field.

According to a fourth aspect, the embodiment may further provide a multi-user wireless local area network sensing method, including: A second network device receives indication information when working at a high frequency, where the indication information indicates the second network device to send a sensing signal, and the indication information is carried in control information corresponding to a frame received by the second network device from a first network device; and the second network device sends the sensing signal based on the indication information.

In an implementation, the frame is a frame carrying a control trailer (frame ended with CT). The CT may be of a predefined sensing type. In this implementation, a newly defined CT type may be obtained by modifying a reserved bit in an existing CT of another type. The CT type may be used to carry information that indicates the second network device to send high frequency sensing, and no MU MIMO-based channel access process is required. This indication manner is more flexible. In addition, an existing reserved bit is used in this manner, without adding new bits. Therefore, indication overheads are not increased.

In an implementation, the sensing signal is an uplink sensing signal.

In another implementation, the sensing signal is a downlink sensing signal.

In an implementation, after receiving the indication information, the second network device sends the sensing signal to the first network device after an SIFS.

In an implementation, the newly defined CT frame includes a field, for example, a sensing indication field, a waveform or sequence set identifier field, and a direction identifier field.

In an implementation, the newly defined CT frame may further include an optional field, for example, a waveform or sequence identifier field, or a repetition field.

In an implementation, a waveform or sequence set indicated by the waveform or sequence set identifier field includes a waveform or sequence indicated by the waveform or sequence identifier field.

According to a fifth aspect, the embodiment may further provide a multi-user wireless local area network sensing method, including: A first network device sends indication information to a plurality of second network devices, where the indication information indicates the plurality of second network devices to send sensing signals, and the indication information is carried in a wireless local area network sensing (WLAN sensing) frame sent by the first network device to the second network device; and the first network device receives the sensing signals sent by the plurality of second network devices and performs sensing.

It can be understood that a new WLAN sensing frame is defined in the method provided in the fifth aspect. The frame may indicate related sensing information sent by the second network device, is implemented without depending on modification of a CT and has higher flexibility. In addition, the frame is not limited to a high frequency and uplink multi-user wireless local area network sensing scenario and is also applicable to a low frequency and downlink multi-user wireless local area network sensing scenario.

In an implementation, the sensing signal is an uplink sensing signal.

In another implementation, the sensing signal is a downlink sensing signal.

In an implementation, the WLAN sensing frame includes but is not limited to the following fields: a frame control field, a common information field, and a station information field.

In an implementation, the common information field includes a field, for example, a waveform or sequence set identifier field.

In an implementation, the common information field further includes an optional field, for example, a sensing indication field.

In an implementation, the station information field includes a field, for example, a direction identifier field.

In an implementation, the station information field further includes an optional field, for example, a waveform or sequence identifier field, or a repetition field.

In an implementation, a waveform or sequence set indicated by the waveform or sequence set identifier field includes a waveform or sequence indicated by the waveform or sequence identifier field.

According to a sixth aspect, the embodiment may further provide a multi-user wireless local area network sensing method, including: A second network device receives indication information, where the indication information indicates the second network device to send a sensing signal, and the indication information is carried in a wireless local area network sensing (WLAN sensing) frame received by the second network device from a first network device; and the second network device sends the sensing signal based on the indication information.

It can be understood that a WLAN sensing frame is defined in the method provided in the sixth aspect. The frame may indicate related sensing information sent by the second network device, is implemented without depending on modification of a CT and has higher flexibility. In addition, the frame is not limited to a high frequency and uplink multi-user wireless local area network sensing scenario and is also applicable to a low frequency and downlink multi-user wireless local area network sensing scenario.

In an implementation, the sensing signal is an uplink sensing signal.

In another implementation, the sensing signal is a downlink sensing signal.

In an implementation, after receiving the indication information, the second network device sends the sensing signal to the first network device after an SIFS.

In an implementation, the WLAN sensing frame includes but is not limited to the following fields: a frame control field, a common information field, and a station information field.

In an implementation, the common information field includes a field, for example, a waveform or sequence set identifier field.

In an implementation, the common information field further includes an optional field, for example, a sensing indication field.

In an implementation, the station information field includes a field, for example, a direction identifier field.

In an implementation, the station information field further includes an optional field, for example, a waveform or sequence identifier field, or a repetition field.

In an implementation, a waveform or sequence set indicated by the waveform or sequence set identifier field includes a waveform or sequence indicated by the waveform or sequence identifier field.

According to a seventh aspect, the embodiment may further provide a first network device. The first network device has a part of or all functions of implementing the first network device in the method example in the first aspect. The function may be implemented by hardware or may be implemented by hardware executing corresponding software. The hardware or the software includes one or more units or modules corresponding to the functions.

A structure of the first network device may include a processing unit and a communication unit. The processing unit is configured to support the first network device in performing a corresponding function in the foregoing method. The communication unit is configured to support communication between the first network device and another device. The first network device may further include a storage unit. The storage unit is configured to couple to the processing unit and a sending unit, and stores program instructions and data of the first network device.

In an implementation, the first network device includes:
  a communication unit, configured to: in a process in which a plurality of second network devices performs high frequency multiple-input multiple-output MIMO channel access, send indication information to the second network device, where the indication information indicates the plurality of second network devices to send uplink sensing signals; and
  the communication unit is further configured to receive the uplink sensing signals sent by the plurality of second network devices; and
  a processing unit, configured to perform uplink sensing based on the uplink sensing signal sent by the second network device.

For example, the processing unit may be a processor, the communication unit may be a transceiver, and the storage unit may be a memory.

In an implementation, the first network device includes:
  a transceiver, configured to: in a process in which a plurality of second network devices performs high frequency multiple-input multiple-output MIMO channel access, send indication information to the second network device, where the indication information indicates the plurality of second network devices to send uplink sensing signals; and
  the transceiver is further configured to receive the uplink sensing signals sent by the plurality of second network devices; and
  a processor, configured to perform uplink sensing based on the uplink sensing signal sent by the second network device.

In an implementation, the transceiver sends a request to send (RTS) frame to the second network device. The indication information is carried in control information corresponding to the RTS frame, and the indication information indicates the second network device to send the uplink sensing signal.

In an implementation, the transceiver may alternatively send a directional multi-gigabit clear to send to self (DMG CTS-to-self) frame to the second network device. The indication information is carried in control information corresponding to the DMG CTS-to-self frame, and the indication information indicates the second network device to send the uplink sensing signal.

In an implementation, the control information is in a control trailer (CT). A predefined bit in the CT may be used to carry the indication information and the predefined bit may be a reserved bit in an existing standard. In this implementation, a reserved bit in an existing CT may be used to indicate information sent to the second network device, without adding new bits. This reduces indication overheads.

In an implementation, the predefined bit includes a field, for example, a sensing indication field, a waveform or sequence set identifier field, and a direction identifier field.

In an implementation, the predefined bit may further include an optional field, for example, a waveform or sequence identifier field, or a repetition field.

In an implementation, a waveform or sequence set indicated by the waveform or sequence set identifier field includes a waveform or sequence indicated by the waveform or sequence identifier field.

According to an eighth aspect, the embodiment may further provide a second network device. The second network device has a part of or all functions of implementing the second network device in the method example in the second aspect. The function may be implemented by hardware or may be implemented by hardware executing corresponding software. The hardware or the software includes one or more units or modules corresponding to the functions.

A structure of the second network device may include a processing unit and a communication unit. The processing unit is configured to support the second network device in performing a corresponding function in the foregoing method. The communication unit is configured to support communication between the second network device and another device. The second network device may further include a storage unit. The storage unit is configured to couple to the processing unit and a sending unit, and stores program instructions and data of the second network device.

In an implementation, the second network device includes:
- a communication unit, configured to receive indication information in a high frequency multiple-input multiple-output MIMO channel access process, where the indication information indicates the communication unit to send an uplink sensing signal; and
- a processing unit, configured to identify the indication information.

The communication unit is further configured to send the uplink sensing signal based on the indication information.

For example, the processing unit may be a processor, the communication unit may be a transceiver, and the storage unit may be a memory.

In an implementation, the second network device includes:
- a transceiver, configured to receive indication information in a high frequency multiple-input multiple-output MIMO channel access process, where the indication information indicates the transceiver to send an uplink sensing signal; and
- a processor, configured to identify the indication information.

The transceiver is further configured to send the uplink sensing signal based on the indication information.

In an implementation, after receiving the indication information, the transceiver sends a directional multi-gigabit clear to send (DMG CTS) frame after a short inter frame space (SIFS) for channel protection, and then sends a corresponding uplink sensing signal based on the indication information. The sensing signal is a waveform or sequence with orthogonality. It can be understood that the DMG CTS frame in this implementation may protect a channel and mute a surrounding hidden node. This ensures smooth sensing.

In an implementation, after receiving the indication information, the transceiver may alternatively send a corresponding uplink sensing signal directly based on the indication information after an SIFS. The sensing signal is a waveform or sequence with orthogonality and has good sensing performance.

In an implementation, the transceiver receives a request to send (RTS) frame sent by a first network device. The indication information is carried in control information corresponding to the RTS frame, and the indication information indicates the second network device to send the uplink sensing signal.

In an implementation, the transceiver may alternatively receive a directional multi-gigabit clear to send to self (DMG CTS-to-self) frame sent by the first network device. The indication information is carried in control information corresponding to the DMG CTS-to-self frame, and the indication information indicates the second network device to send the uplink sensing signal.

In an implementation, the control information is in a control trailer (CT). A predefined bit in the CT may be used to carry the indication information and the predefined bit may be a reserved bit in an existing standard. I In this implementation, a reserved bit in an existing CT may be used to indicate information sent to the second network device, without adding new bits. This reduces indication overheads.

In an implementation, the predefined bit includes a field, for example, a sensing indication field, a waveform or sequence set identifier field, and a direction identifier field.

In an implementation, the predefined bit may further include an optional field, for example, a waveform or sequence identifier field, or a repetition field.

In an implementation, a waveform or sequence set indicated by the waveform or sequence set identifier field includes a waveform or sequence indicated by the waveform or sequence identifier field.

According to a ninth aspect, the embodiment may further provide a first network device. The first network device has a part of or all functions of implementing the first network device in the method example in the third aspect. The function may be implemented by hardware or may be implemented by hardware executing corresponding software. The hardware or the software includes one or more units or modules corresponding to the functions.

A structure of the first network device may include a processing unit and a communication unit. The processing unit is configured to support the first network device in performing a corresponding function in the foregoing method. The communication unit is configured to support communication between the first network device and another device. The first network device may further include a storage unit. The storage unit is configured to couple to the processing unit and a sending unit, and stores program instructions and data of the first network device.

In an implementation, the first network device includes:
- a communication unit, configured to send indication information to a plurality of second network devices working at a high frequency, where the indication information indicates the plurality of second network devices to send sensing signals, and the indication information is carried in control information corresponding to a frame sent by the communication unit to the second network device; and the communication unit is further configured to receive the sensing signals sent by the plurality of second network devices; and a processing unit, configured to sense a received sensing signal.

For example, the processing unit may be a processor, the communication unit may be a transceiver, and the storage unit may be a memory.

In an implementation, the first network device includes:

a transceiver, configured to send indication information to a plurality of second network devices working at a high frequency, where the indication information indicates the plurality of second network devices to send sensing signals, and the indication information is carried in control information corresponding to a frame sent by the transceiver to the second network device; and the transceiver is further configured to receive the sensing signals sent by the plurality of second network devices; and a processor, configured to sense a received sensing signal.

In an implementation, the sensing signal is an uplink sensing signal.

In another implementation, the sensing signal is a downlink sensing signal.

In an implementation, the frame is a frame carrying a control trailer (frame ended with CT). The CT may be of a predefined sensing type. In this implementation, a newly defined CT type may be obtained by modifying a reserved bit in an existing CT of another type. The CT type may be used to carry information that indicates the second network device to send high frequency sensing, and no MU MIMO-based channel access process is required. This indication manner is more flexible. In addition, an existing reserved bit is used in this manner, without adding new bits. Therefore, indication overheads are not increased.

In an implementation, the newly defined CT frame includes a field, for example, a sensing indication field, a waveform or sequence set identifier field, and a direction identifier field.

In an implementation, the newly defined CT frame may further include an optional field, for example, a waveform or sequence identifier field, or a repetition field.

In an implementation, a waveform or sequence set indicated by the waveform or sequence set identifier field includes a waveform or sequence indicated by the waveform or sequence identifier field.

According to a tenth aspect, the embodiment may further provide a second network device. The second network device has a part of or all functions of implementing the second network device in the method example in the fourth aspect. The function may be implemented by hardware or may be implemented by hardware executing corresponding software. The hardware or the software includes one or more units or modules corresponding to the functions.

A structure of the second network device may include a processing unit and a communication unit. The processing unit is configured to support the second network device in performing a corresponding function in the foregoing method. The communication unit is configured to support communication between the second network device and another device. The second network device may further include a storage unit. The storage unit is configured to couple to the processing unit and a sending unit, and stores program instructions and data of the second network device.

In an implementation, the second network device includes:

a communication unit, configured to receive indication information when working at a high frequency, where the indication information indicates the communication unit to send a sensing signal, and the indication information is carried in control information corresponding to a frame received by the communication unit from a first network device; and a processing unit, configured to identify the indication information.

The communication unit is further configured to send the sensing signal based on the indication information.

For example, the processing unit may be a processor, the communication unit may be a transceiver, and the storage unit may be a memory.

In an implementation, the second network device includes:

a transceiver, configured to receive indication information when working at a high frequency, where the indication information indicates the communication unit to send a sensing signal, and the indication information is carried in control information corresponding to a frame received by the transceiver from a first network device; and a processor, configured to identify the indication information.

The transceiver is further configured to send the sensing signal based on the indication information.

In an implementation, the sensing signal is an uplink sensing signal.

In another implementation, the sensing signal is a downlink sensing signal.

In an implementation, the frame is a frame carrying a control trailer (frame ended with CT). The CT may be of a predefined sensing type. It can be understood that in this implementation, a newly defined CT type is obtained by modifying a reserved bit in an existing CT of another type. The CT type is specially used to carry information that indicates the transceiver to send high frequency sensing, and no MU MIMO-based channel access process is required. This indication manner is more flexible. In addition, an existing reserved bit is used in this manner, without adding new bits. Therefore, indication overheads are not increased.

In an implementation, after receiving the indication information, the transceiver sends the sensing signal to the first network device after an SIFS. In an implementation, the newly defined CT frame includes a field, for example, a sensing indication field, a waveform or sequence set identifier field, and a direction identifier field.

In an implementation, the newly defined CT frame may further include an optional field, for example, a waveform or sequence identifier field, or a repetition field.

In an implementation, a waveform or sequence set indicated by the waveform or sequence set identifier field includes a waveform or sequence indicated by the waveform or sequence identifier field.

According to an eleventh aspect, the embodiment may further provide a first network device. The first network device has a part of or all functions of implementing the first network device in the method example in the fifth aspect. The function may be implemented by hardware or may be implemented by hardware executing corresponding software. The hardware or the software includes one or more units or modules corresponding to the functions.

A structure of the first network device may include a processing unit and a communication unit. The processing unit is configured to support the first network device in performing a corresponding function in the foregoing method. The communication unit is configured to support communication between the first network device and another device. The first network device may further include a storage unit. The storage unit is configured to couple to the processing unit and a sending unit, and stores program instructions and data of the first network device.

In an implementation, the first network device includes:
- a communication unit, configured to send indication information to a plurality of second network devices, where the indication information indicates the plurality of second network devices to send sensing signals, and the indication information is carried in a wireless local area network sensing (WLAN sensing) frame sent by the communication unit to the second network device; and
- the communication unit is further configured to receive the sensing signals sent by the plurality of second network devices; and
- a processing unit, configured to sense a received sensing signal.

For example, the processing unit may be a processor, the communication unit may be a transceiver, and the storage unit may be a memory.

In an implementation, the first network device includes:
- a transceiver, configured to send indication information to a plurality of second network devices, where the indication information indicates the plurality of second network devices to send sensing signals, and the indication information is carried in a wireless local area network sensing (WLAN sensing) frame sent by the transceiver to the second network device; and
- the transceiver is further configured to receive the sensing signals sent by the plurality of second network devices; and
- a processor, configured to sense a received sensing signal.

In an implementation, the sensing signal is an uplink sensing signal.

In another implementation, the sensing signal is a downlink sensing signal.

It can be understood that a new WLAN sensing frame is defined in this implementation. The frame may indicate related sensing information sent by the second network device, is implemented without depending on modification of a CT and has higher flexibility. In addition, the frame is not limited to a high frequency and uplink multi-user wireless local area network sensing scenario and is also applicable to a low frequency and downlink multi-user wireless local area network sensing scenario.

In an implementation, the WLAN sensing frame includes but is not limited to the following fields: a frame control field, a common information field, and a station information field.

In an implementation, the common information field includes a field, for example, a waveform or sequence set identifier field.

In an implementation, the common information field further includes an optional field, for example, a sensing indication field.

In an implementation, the station information field includes a field, for example, a direction identifier field.

In an implementation, the station information field further includes an optional field, for example, a waveform or sequence identifier field, or a repetition field.

In an implementation, a waveform or sequence set indicated by the waveform or sequence set identifier field includes a waveform or sequence indicated by the waveform or sequence identifier field.

According to a twelfth aspect, the embodiment may further provide a second network device. The second network device has a part of or all functions of implementing the second network device in the method example in the sixth aspect. The function may be implemented by hardware or may be implemented by hardware executing corresponding software. The hardware or the software includes one or more units or modules corresponding to the functions.

A structure of the second network device may include a processing unit and a communication unit. The processing unit is configured to support the second network device in performing a corresponding function in the foregoing method. The communication unit is configured to support communication between the second network device and another device. The second network device may further include a storage unit. The storage unit is configured to couple to the processing unit and a sending unit, and stores program instructions and data of the second network device.

In an implementation, the second network device includes:
- a communication unit, configured to receive indication information, where the indication information indicates the communication unit to send a sensing signal, and the indication information is carried in a wireless local area network sensing (WLAN sensing) frame received by the communication unit from a first network device; and
- a processing unit, configured to identify the indication information.

The communication unit is further configured to send the sensing signal based on the indication information.

For example, the processing unit may be a processor, the communication unit may be a transceiver, and the storage unit may be a memory.

In an implementation, the second network device includes:
- a transceiver, configured to receive indication information, where the indication information indicates the transceiver to send a sensing signal, and the indication information is carried in a wireless local area network sensing (WLAN sensing) frame received by the transceiver from a first network device; and
- a processor, configured to identify the indication information.

The transceiver is further configured to send the sensing signal based on the indication information.

In an implementation, the sensing signal is an uplink sensing signal.

In another implementation, the sensing signal is a downlink sensing signal.

It can be understood that a WLAN sensing frame is defined in this implementation. The frame may indicate related sensing information sent by the transceiver, is implemented without depending on modification of a CT and has higher flexibility. In addition, the frame is not limited to a high frequency and uplink multi-user wireless local area network sensing scenario and is also applicable to a low frequency and downlink multi-user wireless local area network sensing scenario.

In an implementation, after receiving the indication information, the transceiver sends the sensing signal to the first network device after an SIFS.

In an implementation, the WLAN sensing frame includes but is not limited to the following fields: a frame control field, a common information field, and a station information field.

In an implementation, the common information field includes a field, for example, a waveform or sequence set identifier field.

In an implementation, the common information field further includes an optional field, for example, a sensing indication field.

In an implementation, the station information field includes a field, for example, a direction identifier field.

In an implementation, the station information field further includes an optional field, for example, a waveform or sequence identifier field, or a repetition field.

In an implementation, a waveform or sequence set indicated by the waveform or sequence set identifier field includes a waveform or sequence indicated by the waveform or sequence identifier field.

According to a thirteenth aspect, the embodiment may provide a chip system. The chip system includes a processor and an interface and is configured to support a first network device in implementing a function in the first aspect, for example, at least one of determining or processing data and information in the foregoing method.

The chip system may further include a memory. The memory is configured to store program instructions and data of a terminal device. The chip system may include a chip or may include a chip and another discrete component.

In an implementation, the chip system includes at least one processor and an interface.

The interface is configured to: in a process in which a plurality of second network devices performs high frequency multiple-input multiple-output MIMO channel access, output indication information to the second network device. The indication information indicates the plurality of second network devices to send uplink sensing signals.

The interface is further configured to input the uplink sensing signals sent by the plurality of second network devices.

The processor is configured to perform uplink sensing based on the sent uplink sensing signal.

In an implementation, the interface outputs a request to send (RTS) frame to the second network device. The indication information is carried in control information corresponding to the RTS frame, and the indication information indicates the second network device to send the uplink sensing signal.

In an implementation, the interface may alternatively output a directional multi-gigabit clear to send to self (DMG CTS-to-self) frame to the second network device. The indication information is carried in control information corresponding to the DMG CTS-to-self frame, and the indication information indicates the second network device to send the uplink sensing signal.

In an implementation, the control information is in a control trailer (CT). A predefined bit in the CT may be used to carry the indication information and the predefined bit may be a reserved bit in an existing standard. I In this implementation, a reserved bit in an existing CT may be used to indicate information sent to the second network device, without adding new bits. This reduces indication overheads.

In an implementation, the predefined bit includes a field, for example, a sensing indication field, a waveform or sequence set identifier field, and a direction identifier field.

In an implementation, the predefined bit may further include an optional field, for example, a waveform or sequence identifier field, or a repetition field.

In an implementation, a waveform or sequence set indicated by the waveform or sequence set identifier field includes a waveform or sequence indicated by the waveform or sequence identifier field.

According to a fourteenth aspect, the embodiment may provide a chip system. The chip system includes a processor and an interface and is configured to support a second network device in implementing a function in the second aspect, for example, at least one of determining or processing data and information in the foregoing method.

The chip system may further include a memory. The memory is configured to store program instructions and data of a terminal device. The chip system may include a chip or may include a chip and another discrete component.

In an implementation, the chip system includes at least one processor and an interface.

The interface is configured to receive indication information in a high frequency multiple-input multiple-output MIMO channel access process. The indication information indicates the interface to output an uplink sensing signal.

The processor is configured to identify the indication information.

The interface is further configured to output the uplink sensing signal based on the indication information.

In an implementation, after receiving the indication information, the interface sends a directional multi-gigabit clear to send (DMG CTS) frame after a short inter frame space (SIFS) for channel protection, and then sends a corresponding uplink sensing signal based on the indication information. The sensing signal is a waveform or sequence with orthogonality. It can be understood that the DMG CTS frame in this implementation may protect a channel and mute a surrounding hidden node. This ensures smooth sensing.

In an implementation, after receiving the indication information, the interface may alternatively send a corresponding uplink sensing signal directly based on the indication information after an SIFS. The sensing signal is a waveform or sequence with orthogonality and has good sensing performance.

In an implementation, the interface receives a request to send (RTS) frame sent by a first network device. The indication information is carried in control information corresponding to the RTS frame, and the indication information indicates the second network device to send the uplink sensing signal.

In an implementation, the interface may alternatively receive a directional multi-gigabit clear to send to self (DMG CTS-to-self) frame sent by the first network device. The indication information is carried in control information corresponding to the DMG CTS-to-self frame, and the indication information indicates the second network device to send the uplink sensing signal.

In an implementation, the control information is in a control trailer (CT). A predefined bit in the CT may be used to carry the indication information and the predefined bit may be a reserved bit in an existing standard. In this implementation, a reserved bit in an existing CT may be used to indicate information sent to the second network device, without adding new bits. This reduces indication overheads.

In an implementation, the predefined bit includes a field, for example, a sensing indication field, a waveform or sequence set identifier field, and a direction identifier field.

In an implementation, the predefined bit may further include an optional field, for example, a waveform or sequence identifier field, and/or a repetition field.

In an implementation, a waveform or sequence set indicated by the waveform or sequence set identifier field includes a waveform or sequence indicated by the waveform or sequence identifier field.

According to a fifteenth aspect, the embodiment may provide a chip system. The chip system includes a processor and an interface and is configured to support a first network device in implementing a function in the third aspect, for example, at least one of determining or processing data and information in the foregoing method.

The chip system may further include a memory. The memory is configured to store program instructions and data of a terminal device. The chip system may include a chip or may include a chip and another discrete component.

In an implementation, the chip system includes at least one processor and an interface.

The interface is configured to output indication information to a plurality of second network devices working at a high frequency. The indication information indicates the plurality of second network devices to send sensing signals, and the indication information is carried in control information corresponding to a frame output by the interface to the second network device.

The interface is further configured to input the uplink sensing signals sent by the plurality of second network devices.

The processor is configured to sense a received sensing signal.

In an implementation, the sensing signal is an uplink sensing signal.

In another implementation, the sensing signal is a downlink sensing signal.

In an implementation, the frame is a frame carrying a control trailer (frame ended with CT). The CT may be of a predefined sensing type. In this implementation, a newly defined CT type may be obtained by modifying a reserved bit in an existing CT of another type. The CT type may be used to carry information that indicates the second network device to send high frequency sensing, and no MU MIMO-based channel access process is required. This indication manner is more flexible. In addition, an existing reserved bit is used in this manner, without adding new bits. Therefore, indication overheads are not increased.

In an implementation, the newly defined CT frame includes a field, for example, a sensing indication field, a waveform or sequence set identifier field, and a direction identifier field.

In an implementation, the newly defined CT frame may further include an optional field, for example, a waveform or sequence identifier field, or a repetition field.

In an implementation, a waveform or sequence set indicated by the waveform or sequence set identifier field includes a waveform or sequence indicated by the waveform or sequence identifier field.

According to a sixteenth aspect, the embodiment may provide a chip system. The chip system includes a processor and an interface and is configured to support a second network device in implementing a function in the fourth aspect, for example, at least one of determining or processing data and information in the foregoing method.

The chip system may further include a memory. The memory is configured to store program instructions and data of a terminal device. The chip system may include a chip or may include a chip and another discrete component.

In an implementation, the chip system includes at least one processor and an interface.

The interface is configured to input indication information when working at a high frequency. The indication information indicates a communication unit to send a sensing signal, and the indication information is carried in control information corresponding to a frame input to the interface from a first network device.

The processor is configured to identify the indication information.

The interface is further configured to output the sensing signal based on the indication information.

In an implementation, the sensing signal is an uplink sensing signal.

In another implementation, the sensing signal is a downlink sensing signal.

In an implementation, the frame is a frame carrying a control trailer (frame ended with CT). The CT may be of a predefined sensing type. I In this implementation, a newly defined CT type may be obtained by modifying a reserved bit in an existing CT of another type. The CT type may be used to carry information that indicates the interface to output high frequency sensing, and no MU MIMO-based channel access process is required. This indication manner is more flexible. In addition, an existing reserved bit is used in this manner, without adding new bits. Therefore, indication overheads are not increased.

In an implementation, after receiving the indication information, the interface outputs the sensing signal to the first network device after an SIFS.

In an implementation, the newly defined CT frame includes a field, for example, a sensing indication field, a waveform or sequence set identifier field, and a direction identifier field.

In an implementation, the newly defined CT frame may further include an optional field, for example, a waveform or sequence identifier field, or a repetition field.

In an implementation, a waveform or sequence set indicated by the waveform or sequence set identifier field includes a waveform or sequence indicated by the waveform or sequence identifier field.

According to a seventeenth aspect, the embodiment may provide a chip system. The chip system includes a processor and an interface and is configured to support a first network device in implementing a function in the fifth aspect, for example, at least one of determining or processing data and information in the foregoing method.

The chip system may further include a memory. The memory is configured to store program instructions and data of a terminal device. The chip system may include a chip or may include a chip and another discrete component.

In an implementation, the chip system includes at least one processor and an interface.

The interface is configured to send indication information to a plurality of second network devices. The indication information indicates the plurality of second network devices to send sensing signals, and the indication information is carried in a wireless local area network sensing (WLAN sensing) frame output by the interface to the second network device.

The interface is further configured to input the uplink sensing signals sent by the plurality of second network devices.

The processor is configured to sense a received sensing signal.

In an implementation, the sensing signal is an uplink sensing signal.

In another implementation, the sensing signal is a downlink sensing signal.

It can be understood that a new WLAN sensing frame is defined in this implementation. The frame may be designed to indicate related sensing information sent by the second network device, is implemented without depending on modification of a CT and has higher flexibility. In addition, the frame is not limited to a high frequency and uplink multi-user wireless local area network sensing scenario and is also applicable to a low frequency and downlink multi-user wireless local area network sensing scenario.

In an implementation, the WLAN sensing frame includes but is not limited to the following fields: a frame control field, a common information field, and a station information field.

In an implementation, the common information field includes a field, for example, a waveform or sequence set identifier field.

In an implementation, the common information field further includes an optional field, for example, a sensing indication field.

In an implementation, the station information field includes a field, for example, a direction identifier field.

In an implementation, the station information field further includes an optional field, for example, a waveform or sequence identifier field, or a repetition field.

In an implementation, a waveform or sequence set indicated by the waveform or sequence set identifier field includes a waveform or sequence indicated by the waveform or sequence identifier field.

According to an eighteenth aspect, the embodiment may provide a chip system. The chip system includes a processor and an interface and is configured to support a second network device in implementing a function in the sixth aspect, for example, at least one of determining or processing data and information in the foregoing method.

The chip system may further include a memory. The memory is configured to store program instructions and data of a terminal device. The chip system may include a chip or may include a chip and another discrete component.

In an implementation, the chip system includes at least one processor and an interface.

The interface is configured to input indication information. The indication information indicates the interface to output a sensing signal, and the indication information is carried in a wireless local area network sensing (WLAN sensing) frame input to the interface from a first network device.

The processor is configured to identify the indication information.

The interface is further configured to send the sensing signal based on the indication information.

In an implementation, the sensing signal is an uplink sensing signal.

In another implementation, the sensing signal is a downlink sensing signal.

It can be understood that a WLAN sensing frame is defined in this implementation. The frame may indicate related sensing information output by the interface, is implemented without depending on modification of a CT and has higher flexibility. In addition, the frame is not limited to a high frequency and uplink multi-user wireless local area network sensing scenario and is also applicable to a low frequency and downlink multi-user wireless local area network sensing scenario.

In an implementation, after receiving the indication information, the interface outputs the sensing signal to the first network device after an SIFS.

In an implementation, the WLAN sensing frame includes but is not limited to the following fields: a frame control field, a common information field, and a station information field.

In an implementation, the common information field includes a field, for example, a waveform or sequence set identifier field.

In an implementation, the common information field further includes an optional field, for example, a sensing indication field.

In an implementation, the station information field includes a field, for example, a direction identifier field.

In an implementation, the station information field further includes an optional field, for example, a waveform or sequence identifier field, or a repetition field.

In an implementation, a waveform or sequence set indicated by the waveform or sequence set identifier field includes a waveform or sequence indicated by the waveform or sequence identifier field.

According to a nineteenth aspect, an embodiment may provide a non-transitory computer-readable storage medium, configured to store computer software instructions used by the foregoing first network device. The non-transitory computer-readable storage medium includes a program used to perform the method in the first aspect, the third aspect, and the fifth aspect.

According to a twentieth aspect, an embodiment may provide a non-transitory computer-readable storage medium, configured to store computer software instructions used by the foregoing second network device. The non-transitory computer-readable storage medium includes a program used to perform the method in the second aspect, the fourth aspect, and the sixth aspect.

According to a twenty-first aspect, the embodiment may further provide a computer program product including instructions. When the computer program product runs on a computer, the computer is enabled to perform the method in the first aspect, the third aspect, and the fifth aspect.

According to a twenty-second aspect, the embodiment may further provide a computer program product including instructions. When the computer program product runs on a computer, the computer is enabled to perform the method in the second aspect, the fourth aspect, and the sixth aspect.

According to a twenty-third aspect, the embodiment may further provide a functional entity, configured to perform the method in any one of the first aspect to the sixth aspect.

DETAILED DESCRIPTION OF THE EMBODIMENTS

The following describes the embodiments with reference to the accompanying drawings.

The method in the embodiments relates to a scenario in which sensing is performed between multiple transmitting nodes and one or more receiving nodes, and is applicable to a wireless local area network (WLAN) system, and in particular, to a WLAN system in the 802.11ad standard, the 802.11ay standard, and a subsequent improved standard.

The embodiments are applicable to a scenario with multiple measurement nodes and a scenario with multiple transmitting nodes.

Figure 1:
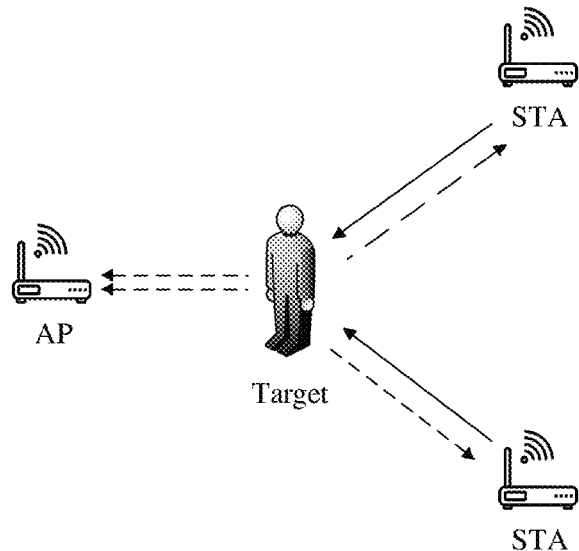
FIG. 1 is a schematic diagram of a scenario with multiple transmitting nodes according to an embodiment.

In a scenario with multiple transmitting nodes shown in FIG. 1, a plurality of STAs is used as transmitting nodes, and an AP is used as a measurement node. In this scenario, each of the plurality of STAs may separately perform mono-static sensing, or the AP may perform bi-static sensing in cooperation with a plurality of STAs, to provide a gain of multiple transmitting nodes. In addition, sensing information in a bi-static scenario is directly measured on an AP side. This reduces feedback overheads. In a scenario with multiple measurement nodes shown in FIG. 2, an access point (AP) is used as a transmitting node, and a plurality of stations (STA) is used as measurement nodes. The AP may perform mono-static sensing or may cooperate with the plurality of STAs to perform bi-static sensing. The plurality of STAs at different locations may measure a target from different angles. This provides a gain of multiple measurement nodes.

Figure 2:
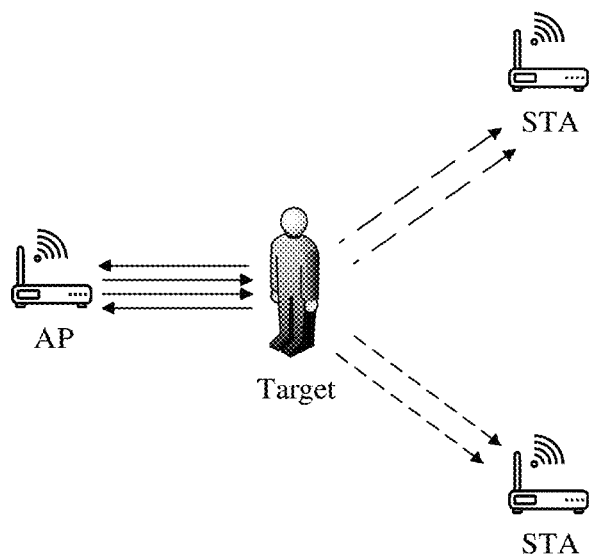
FIG. 2 is a schematic diagram of a scenario with multiple measurement nodes according to an embodiment.

In a WLAN system corresponding to the scenario with multiple transmitting nodes shown in FIG. 1 and the scenario with multiple measurement nodes shown in FIG. 2, a receiving node (which may also be referred to as a first network device) may be a personal basic service set control point (PCP)/access point (AP), and a transmitting node (which may also be referred to as a second network device) may be a station (STA). The first network device and the second network device may be, for example, a communication server, a router, a switch, a bridge, a smartphone, a tablet computer, a notebook computer, or another wireless communication device.

Generally, wireless devices such as a switch, an air conditioner, and a socket are installed indoors. Wireless signals may be transmitted and received between wireless devices. When a user is indoor, a wireless signal sent by a transmit end may be reflected by the user's body to a receive end of the wireless signal. A physical feature in the wireless signal may be extracted by the receive end, and a current status of the user is measured through analyzing the extracted physical feature. For example, whether the user moves and a moving speed are measured, or information such as a distance from the user to the signal transmit end or the signal receive end, or an orientation of the user is measured. Status information obtained through measurement may be used to predict that the user is to operate an indoor device. Alternatively, in an outdoor scenario, for example, status information of a target located between a transmitting node and a measurement node may be measured based on a physical feature of a wireless signal transmitted between wireless devices.

The receiving node (the first network device) and the transmitting node (the second network device) in the embodiments may also be collectively referred to as a communication node. The following briefly describes a structure of the communication node.

Figure 3:
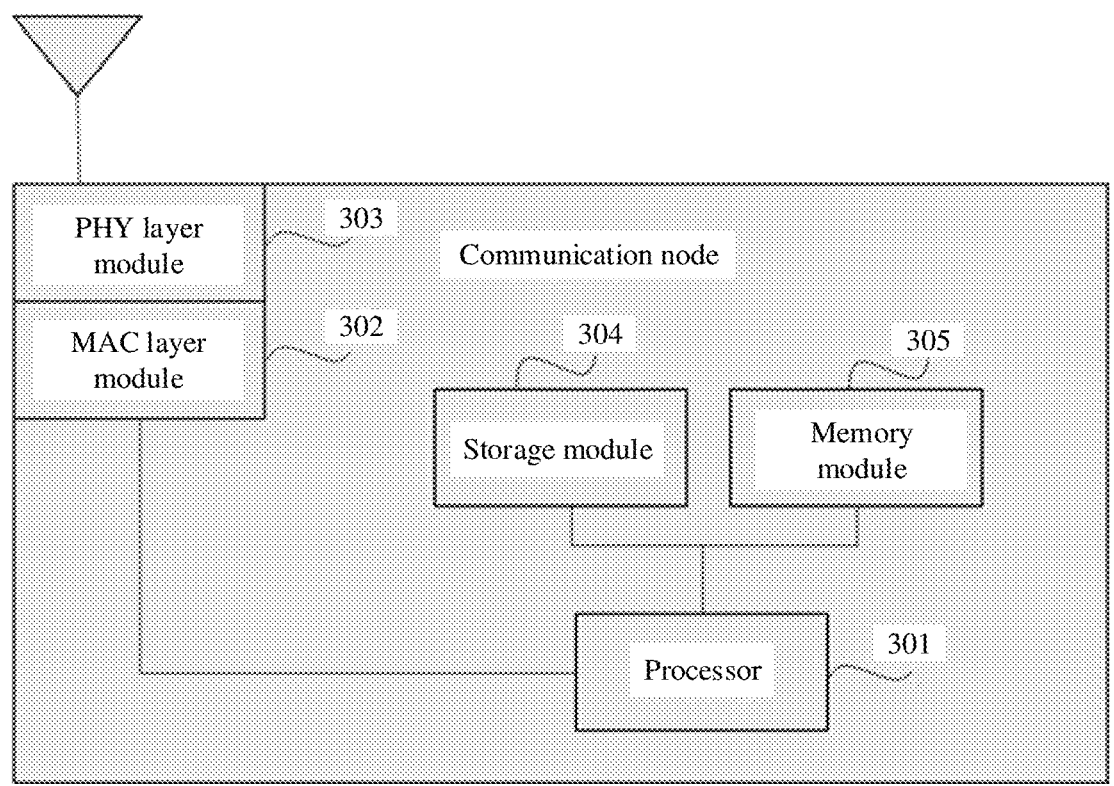
FIG. 3 is a schematic diagram depicting a structure of a communication node according to an embodiment.

FIG. 3 is a schematic diagram depicting a structure of a communication node according to an embodiment. As shown in FIG. 3, the communication node may include a processor 301, a media access control (MAC) layer module 302, a physical (PHY) layer module 303, a memory module 304, and a storage module 305. The memory module 304 may store software code or program instructions, and the software code or the program instructions may also be referred to as firmware. The storage module 305 may store information needed by the software code or the program instructions. The processor 301 may control the MAC layer module 302 and the PHY layer 303 by invoking the software code or the program instructions stored in the memory module 304 and with reference to the information stored in the storage module 305, to implement an information transmission method provided in the following embodiments. The processor 301 may be, for example, a central processing unit (CPU), the MAC layer module 302 may be, for example, a high frequency media access control (HF MAC) layer module, the PHY layer module 303 may be, for example, a high frequency physical (HF PHY) layer module, the memory module 304 may be, for example, a read-only memory (ROM), and the storage module 305 may be, for example, a random access memory (RAM). The modules in the communication node are merely examples for description. This is not limited.

For ease of understanding the embodiments, the following describes an application scenario. A service scenario is intended to describe the embodiments more clearly, and does not constitute a limitation on the embodiments of. A person of ordinary skill in the art may know that, as a new service scenario emerges, the embodiments are also applicable to a similar problem.

In the embodiments and accompanying drawings, the terms "first", "second", and the like are intended to distinguish between different objects or distinguish between different processing of a same object, but do not indicate a particular order of the objects.

"At least one" means one or more.

"A plurality of" refers to two or more than two.

The character "l" generally indicates an "or" relationship between associated objects. For example, A/B may represent A or B.

In addition, the terms "including", "having", or any other variant thereof in the descriptions are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device.

It should be noted that, in embodiments, the word "example" or "for example" is used to represent giving an example, an illustration, or a description. Any embodiment described as an "example" or with "for example" in the embodiments should not be explained as being more preferred or having more advantages than another embodiment. Use of the word "example" or "for example" is intended to present a related concept.

In the embodiments and the accompanying drawings, "of", "relevant", and "corresponding" may sometimes be interchangeably used. It should be noted that consistent meanings are expressed when differences are not emphasized.

The embodiments may provide a plurality of solutions for implementing high efficiency multi-user wireless local area network sensing. The embodiments may be based on a MIMO channel access process and improves the process and implements a solution of UL MU sensing in WLAN Sensing based on a MIMO channel access process. In another implementation, the embodiments may implement a solution of MU sensing in WLAN Sensing based on a CT (or modification of an existing CT of another type). In still another implementation, the embodiments may implement a solution of MU sensing in WLAN Sensing based on a frame.

The embodiments may relate to a scenario in which sensing is performed between a plurality of transmitting nodes and one or more receiving nodes. This application is described by using a scenario with one initiator (AP) and a plurality of responders (STA) as an example and may also be expanded to a scenario with a plurality of initiators (APs) and a plurality of responders (STAs).

In the embodiments, the first network device may be an initiator and the second network device may be a responder. The initiator may be an AP or a STA. Correspondingly, the responder may be a STA or an AP.

Embodiment 1

This embodiment describes a method for simultaneously performing uplink wireless local area network sensing by multiple users in a high frequency scenario. The method is based on a high frequency MU MIMO channel access process and improves the process and resolves a failure of high efficiency UL MU sensing in high frequency sensing.

Figure 4:
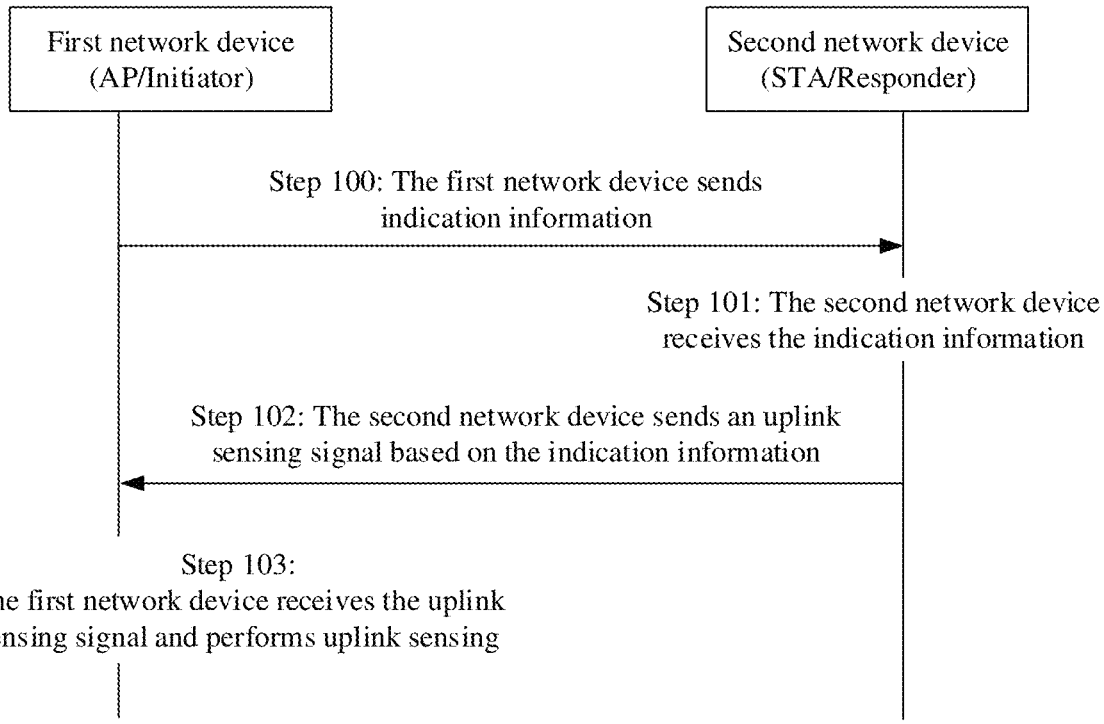
FIG. 4 is a schematic flowchart of an uplink multi-user wireless local area network sensing method according to an embodiment.

As shown in FIG. 4, an uplink multi-user wireless local area network sensing method may include the following steps:

Step 100: In a process in which a plurality of second network devices performs high frequency multiple-input multiple-output MIMO channel access, a first network device sends indication information to the second network device, where the indication information indicates the plurality of second network devices to send uplink sensing signals.

Step 101: The second network device receives the indication information.

Step 102: The second network device sends the uplink sensing signal based on the indication information.

Step 103: The first network device receives the uplink sensing signal sent by the second network device and performs uplink sensing.

It can be understood that the high frequency MU MIMO channel access process is improved in this embodiment. The first network device sends the indication information to the second network device. This seamlessly implements a function of simultaneously performing uplink wireless local area network sensing by multiple users in a high frequency scenario.

Embodiment 2

Figure 6A:
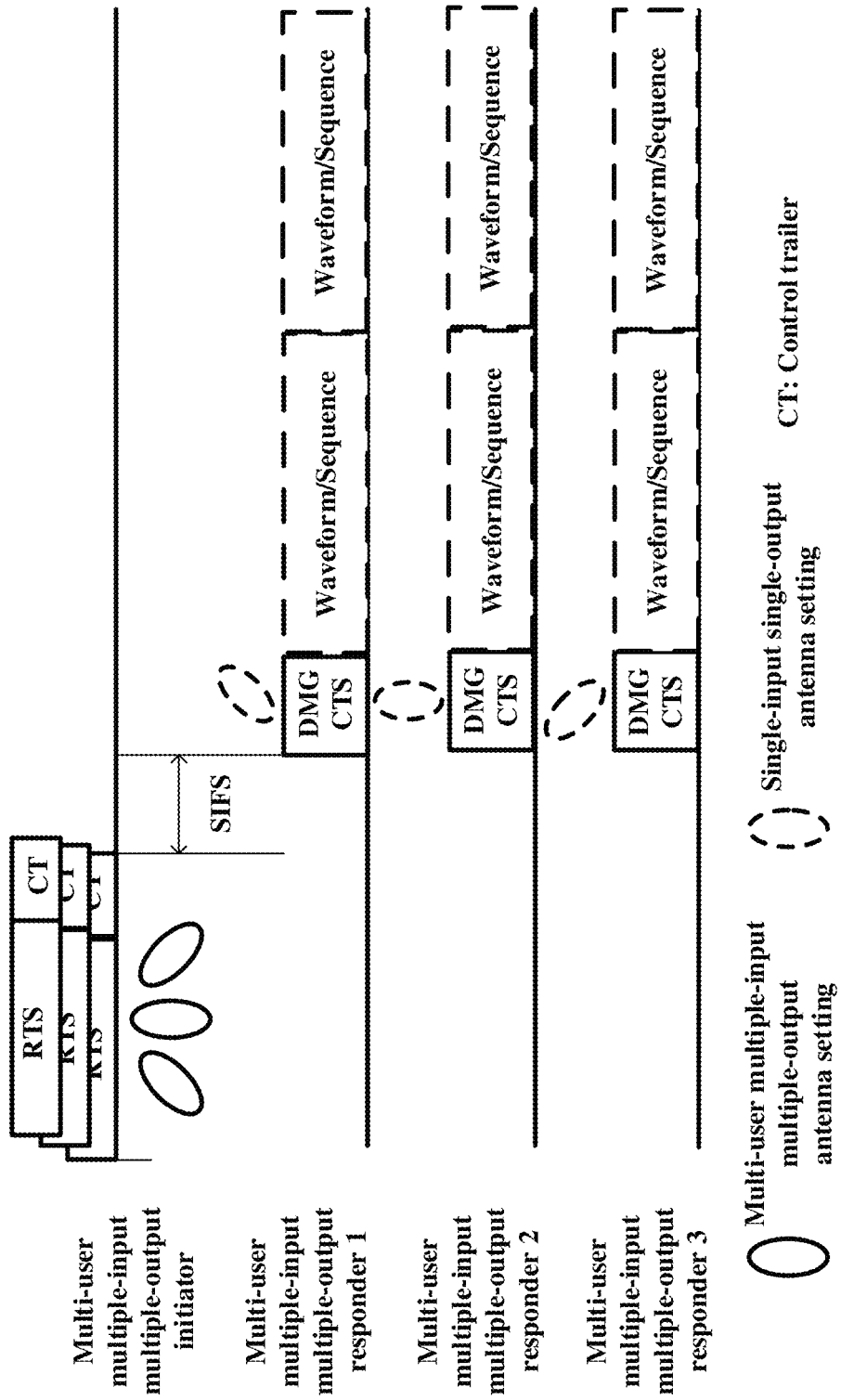
FIG. 6a is a schematic diagram of a UL MU sensing procedure based on an RTS procedure according to an embodiment.

This embodiment describes a method for implementing uplink multi-user wireless local area network sensing based on an RTS frame. An implementation process is shown in FIG. 6a. In a high frequency scenario, a first network device (represented as a multi-user multiple-input multiple-output initiator in the figure) sends an RTS frame and a CT to a plurality of second network devices (represented as multi-user multiple-input multiple-output responders in the figure). The CT is connected to a tail of the RTS frame. The CT includes control information, and indication information that indicates the second network device to send an uplink sensing signal is carried in the control information. The indication information may be a reserved bit in the CT. The indication information includes information corresponding to the plurality of second network devices, such as waveforms/sequences to be transmitted, sending directions of beams, and a quantity of repetition times of sending waveforms/sequences. A predefined bit may include a field, such as a sensing indication field, a waveform or sequence set identifier field, and a direction identifier field, and may further include an optional field, such as a waveform or sequence identifier field, or a repetition field. A waveform or sequence set indicated by the waveform or sequence set identifier field includes a waveform or sequence indicated by the waveform or sequence identifier field. After receiving the indication information, the second network device sends a DMG CTS frame after a short inter frame space (SIFS) for channel protection and starts to send the uplink sensing signal based on an indication of the indication information. The sensing signal is represented as a waveform or sequence with orthogonality. Then, the first network device receives the uplink sensing signals sent by the plurality of second network devices and performs uplink sensing. This solution is based on a high frequency MU MIMO channel access process and improves the process and resolves a failure of high efficiency UL MU sensing in high frequency sensing. In addition, the DMG CTS frame mutes a surrounding hidden node in this solution. This protects a channel and ensures efficient and smooth sensing.

As shown in Table 1, in the foregoing RTS frame-based solution, the indication information is carried in the control information corresponding to the RTS frame, the control information is in the CT, the indication information may be a predefined bit in the CT, and the predefined bit is a reserved bit in an existing standard. In this method, a reserved bit in the CT is used to indicate information sent to the second network device, without adding new bits. This reduces indication overheads.

TABLE 1

Control trailer (CT) frame format

| Field | Number of bits | Start bit | Description |
|---|---|---|---|
| Control trailer format type (CT Format Type) | 4 | 0 | ... |
| Channel aggregation | 1 | 4 | ... |
| Bandwidth (BW) | 8 | 5 | ... |
| Primary channel number | 3 | 13 | ... |
| Single-input single-output/multiple-input multiple-output (SISO/MIMO) | 1 | 16 | ... |
| Single-user/multi-user multiple-input multiple-output (SU/MU MIMO) | 1 | 17 | ... |
| Transmit sector combination index | 6 | 18 | ... |
| Enhanced directional multi-gigabit group identifier (EDMG Group ID) | 8 | 24 | ... |
| Multi-user multiple-input multiple-output transmission configuration type (MU-MIMO Transmission Configuration Type) | 1 | 32 | ... |
| Multi-user multiple-input multiple-output transmission configuration index (MU-MIMO Transmission Configuration Index) | 3 | 33 | ... |
| Total number of sections most significant bit | 4 | 36 | ... |
| Number of receive end DMG antennas most significant bit | 1 | 40 | ... |
| Hybrid beamforming (HBF) | 1 | 41 | ... |
| Reserved | 86 | 42 | Reserved bits shall be set to 0 by the transmitter and shall be ignored by the receiver. |
| Control trailer check sequence (CTCS) | 16 | 128 | ... |

Figure 5:
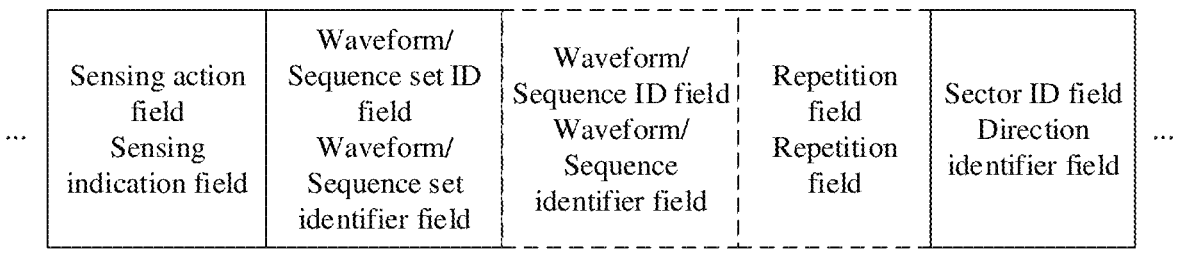
FIG. 5 is a schematic diagram of a frame structure of a predefined bit according to an embodiment.

As shown in FIG. 5, the predefined bit may include a field such as a sensing indication field, a waveform or sequence set identifier field, and a direction identifier field, or may include an optional field such as a waveform or sequence identifier field, or a repetition field. Definitions corresponding to the fields are shown in Table 2. It should be noted that an example in which the control information is in the CT is used for description in this embodiment. However, the scope of this embodiment is not limited thereto.

TABLE 2

Fields and their descriptions in a control trailer (CT)

| Field | Description |
|---|---|
| Sensing indication field Field (Sensing action field) | The field indicates a plurality of second network devices Description (responder) to perform sensing, and the field occupies 1 bit. When a bit value is 1, it indicates the plurality of second network devices (responder) to send uplink sensing signals. When a bit value is 0, it is a default value and an original MIMO channel access process is performed. |
| Waveform/Sequence set identifier field | The field indicates IDs of waveform/sequence sets sent by the plurality of second network devices (responder). |
| Waveform/Sequence identifier field | The field indicates a waveform/sequence ID sent by each second network device (responder). These IDs may be allocated by a first network device (initiator) or may be sent in a default order (in this case, no special indication is needed, and the default field may be used). |
| Repetition field | The field indicates a quantity of repetition times of sending a related waveform/sequence by the second network device (responder) (when repetition is not needed, the default field may be used). |
| Direction identifier field | The field indicates a sending direction in which the second network device (responder) sends a related waveform/sequence. With reference to the repetition field, the responder may continuously send a waveform/sequence for a plurality of times at a same direction or different directions. |

In Table 2, based on different definitions corresponding to the fields, corresponding bit values may be used for indication. For example, the sensing indication field may use 1 bit for indication. When a bit value is 1, it indicates a plurality of responders to send uplink sensing signals. When a bit value is 0, it indicates that an original MIMO channel access process is performed. Further, the plurality of responders may be indicated to send the uplink sensing signals when the bit value is 0, and the original MIMO channel access process is performed when the bit value is 1. Such equivalent changes fall within the scope of the embodiments. It is similar for bits indicating other fields, and details are not described again.

In an implementation, the waveform/sequence set identifier field indicates identifiers of waveform/sequence sets sent by the plurality of responders. For example, a waveform/sequence set 1 includes four waveform/sequence identifiers: 1, 2, 3, and 4, and is represented as set 1={1, 2, 3, 4}. A waveform/sequence set 2 also includes four waveform/sequence identifiers: 5, 6, 7, and 8, and is represented as set 2={5, 6, 7, 8}. When the responder performs sending in a default order, a plurality of waveform/sequence identifiers may be directly indicated by using one waveform/sequence set identifier, and a default waveform/sequence identifier field may be used. For example, the set 1 may indicate the waveform/sequence identifiers of 1 to 4, and the set 2 may indicate the waveform/sequence identifiers of 5 to 8. When the waveform/sequence identifiers are not sent in a default order, each waveform/sequence sent by the responder needs to be separately indicated by using a waveform/sequence identifier.

In another implementation, the waveform/sequence set identifier field indicates waveform/sequence sets sent by the plurality of responders. For example, there are four waveform/sequence sets in different lengths, corresponding to waveform/sequence sets in lengths 128, 256, 512, and 1024. The waveform/sequence set identifier needs two bits to indicate the waveform/sequence sets in the four lengths. For example, 00 indicates a waveform/sequence set in the length of 128; 01 indicates a waveform/sequence set in the length of 256; 10 indicates a waveform/sequence set in the length of 512; and 11 indicates a waveform/sequence set of the length of 1024. With development of technologies, the waveform/sequence set identifier field may further indicate a waveform/sequence set in another length.

For example, a waveform/sequence set in the length of 128 is indicated. It is assumed that the waveform/sequence set in the length of 128 includes four waveform/sequences. When there is a correspondence between the waveform/sequence set and a sequence included in the waveform/sequence set, it indicates that the waveform/sequence set can indicate the four waveforms/sequences included in the waveform/sequence set. When there is no correspondence between the waveform/sequence set and a waveform/sequence included in the waveform/sequence set, each waveform/sequence included in the waveform/sequence set needs to be indicated by using a waveform/sequence identifier.

The waveform/sequence identifier field indicates a corresponding waveform/sequence sent by each responder. For example, there are three responders, and the field uses {3, 2, 4} to indicate a responder 1 to send the third sequence, a responder 2 to send the second sequence, and a responder 3 to send the fourth sequence. When the responder sends the sequence in a default order, the initiator may not perform an indication. In this case, the responder 1 sends the first sequence by default, the responder 2 sends the second sequence by default, the responder 3 sends the third sequence by default, and the default waveform/sequence identifier field may be used.

The repetition field indicates a quantity of repetition times of sending a related waveform/sequence by the responder. For example, when the quantity of repetition times is 0, it indicates that repeated sending does not need to be performed, and the default field may be used. When the quantity of repetition times is 1, it indicates that the related waveform/sequence is repeatedly sent once, in other words, the related waveform/sequence is sent twice in total, and so on. A larger quantity of repetition times is equivalent to a larger quantity of times of target sensing. This helps improve sensing effect and a sensing result is more accurate.

The direction identifier field indicates a sending direction in which the responder sends a related waveform/sequence, so that responders can send sensing signals in different directions. This achieves high efficiency target sensing at different spatial locations. In addition, the direction identifier field may be combined with the repetition field, that is, the responder may continuously send a waveform/sequence for a plurality of times at a same direction or different directions.

It should be noted that, in implementation, Table 2 and Table 1 may be combined to form a new table or may be independent tables.

Embodiment 3

Figure 6B:
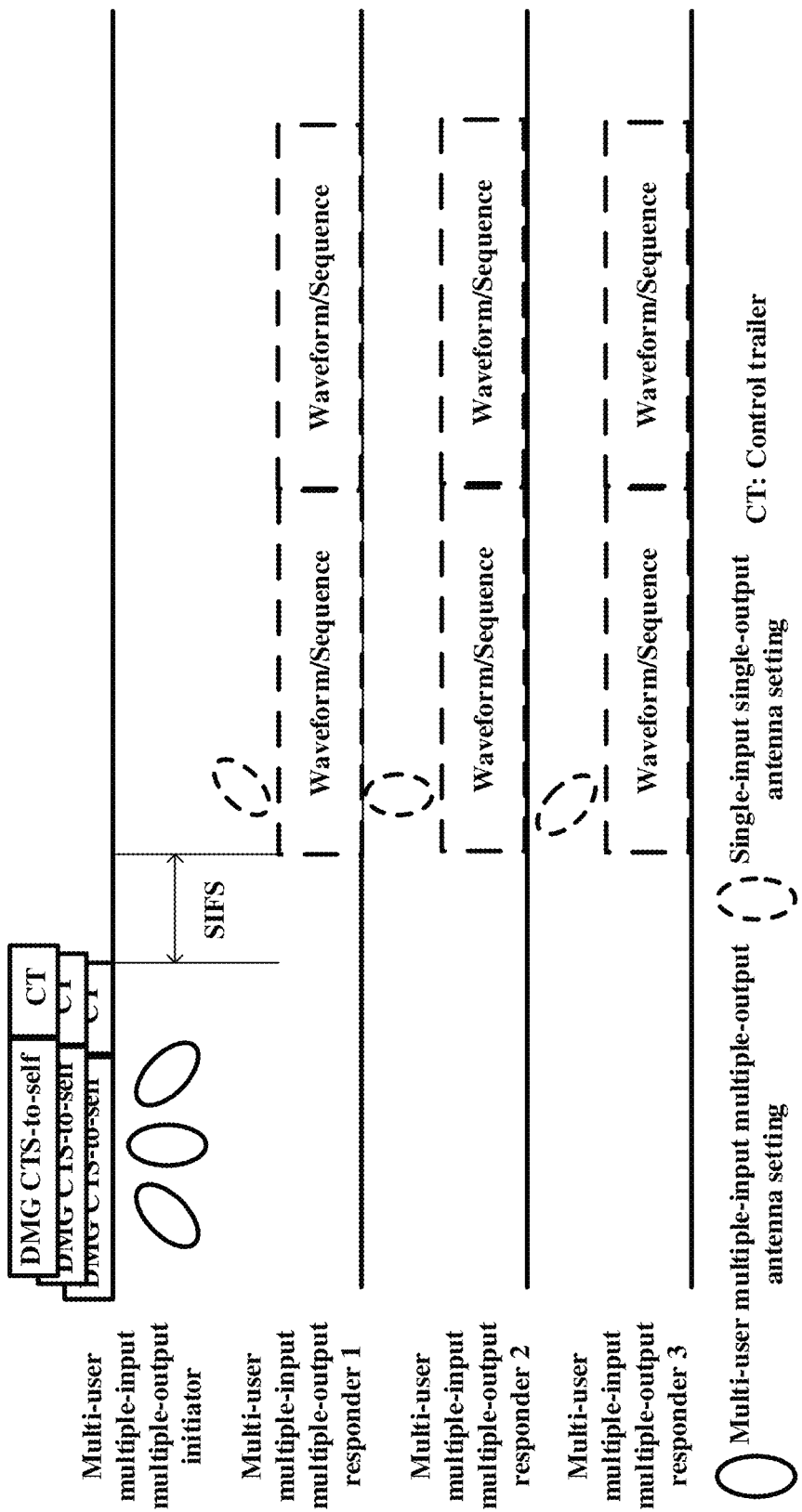
FIG. 6b is a schematic diagram of a UL MU sensing procedure based on a DMG CTS-to-Self procedure according to an embodiment.

This embodiment describes a method for implementing uplink multi-user wireless local area network sensing based on a DMG CTS-to-self frame. An implementation process is shown in FIG. 6b. In a high frequency scenario, a first network device (represented as a multi-user multiple-input multiple-output initiator in the figure) sends a DMG CTS-to-self frame and a CT to a plurality of second network devices (represented as multi-user multiple-input multiple-output responders in the figure). The CT is connected to a tail of the DMG CTS-to-self frame. The CT includes control information, and indication information that indicates the second network device to send an uplink sensing signal is carried in the control information. The indication information includes information corresponding to the plurality of second network devices, such as waveforms/sequences to be transmitted, sending directions of beams, and a quantity of repetition times of sending waveforms/sequences. A predefined bit may include an optional field, such as a sensing indication field, a waveform or sequence set identifier field, and a direction identifier field, and may further include an optional field, such as a waveform or sequence identifier field, or a repetition field. A waveform or sequence set indicated by the waveform or sequence set identifier field includes a waveform or sequence indicated by the waveform or sequence identifier field. After receiving the indication information, the second network device directly sends the uplink sensing signal after an SIFS. The sensing signal is represented as a waveform or sequence with orthogonality. Then, the first network device receives the uplink sensing signals sent by the plurality of second network devices and performs uplink sensing. This solution is based on a high frequency MU MIMO channel access process and improves the process and resolves a failure of high efficiency UL MU sensing in high frequency sensing.

As shown in Table 1, in the foregoing DMG CTS-to-self frame-based solution, the indication information is carried in the control information corresponding to the DMG CTS-to-self frame, the control information is in the CT, the indication information may be a predefined bit in the CT, and the predefined bit is a reserved bit in an existing standard. In this method, a reserved bit in the CT is used to indicate information sent to the second network device, without adding new bits. This reduces indication overheads. As shown in FIG. 5, the predefined bit may include a field such as a sensing indication field, a waveform or sequence set identifier field, and a direction identifier field, or may include an optional field such as a waveform or sequence identifier field, or a repetition field. Definitions corresponding to the fields are shown in Table 2.

It should be noted that this embodiment is described by using an example in which control information is in a CT. However, the scope of embodiments is not limited thereto. This embodiment may be applied to a scenario with multiple transmitting nodes or multiple measurement nodes.

The predefined bits in Embodiment 2 and Embodiment 3 may be implemented by using 86 reserved bits in Table 1.

The predefined bit may indicate a field shown in Table 2. Descriptions and functions of the fields in Table 2 are described in the previous embodiment, and details are not described herein again.

In an implementation, a frame structure in which the reserved bit is used to indicate the plurality of second network devices working at a high frequency to send the uplink sensing signals is shown in FIG. 5. It should be noted that this is merely an example. In the frame structure used to indicate the plurality of second network devices working at the high frequency to send the uplink sensing signals, there may be another implementation for an arrangement sequence of the fields.

Embodiment 4

This embodiment describes a method for simultaneously performing wireless local area network sensing by multiple users in a high frequency scenario by defining a new CT type.

Figure 7:
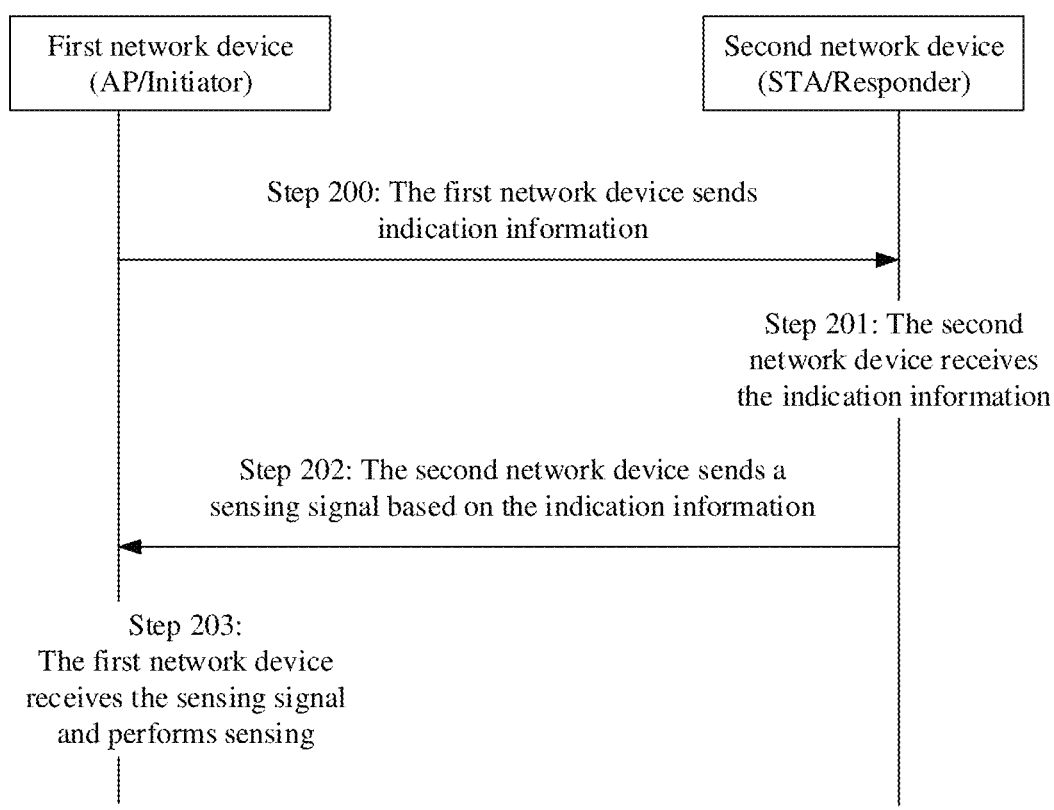
FIG. 7 is a schematic flowchart of a multi-user wireless local area network sensing method according to an embodiment.

As shown in FIG. 7, a multi-user wireless local area network sensing method may include the following steps.

Step 200: A first network device sends indication information to a plurality of second network devices, where the indication information indicates the plurality of second network devices to send sensing signals.

Step 201: The second network device receives the indication information sent by the first network device.

Step 202: The second network device sends the sensing signal based on the indication information.

Step 203: The first network device receives the sensing signal sent by the second network device and performs sensing.

In this embodiment, the indication information that indicates the plurality of second network devices working at the high frequency to send the sensing signals is implemented by using a newly defined CT type.

Figure 8:
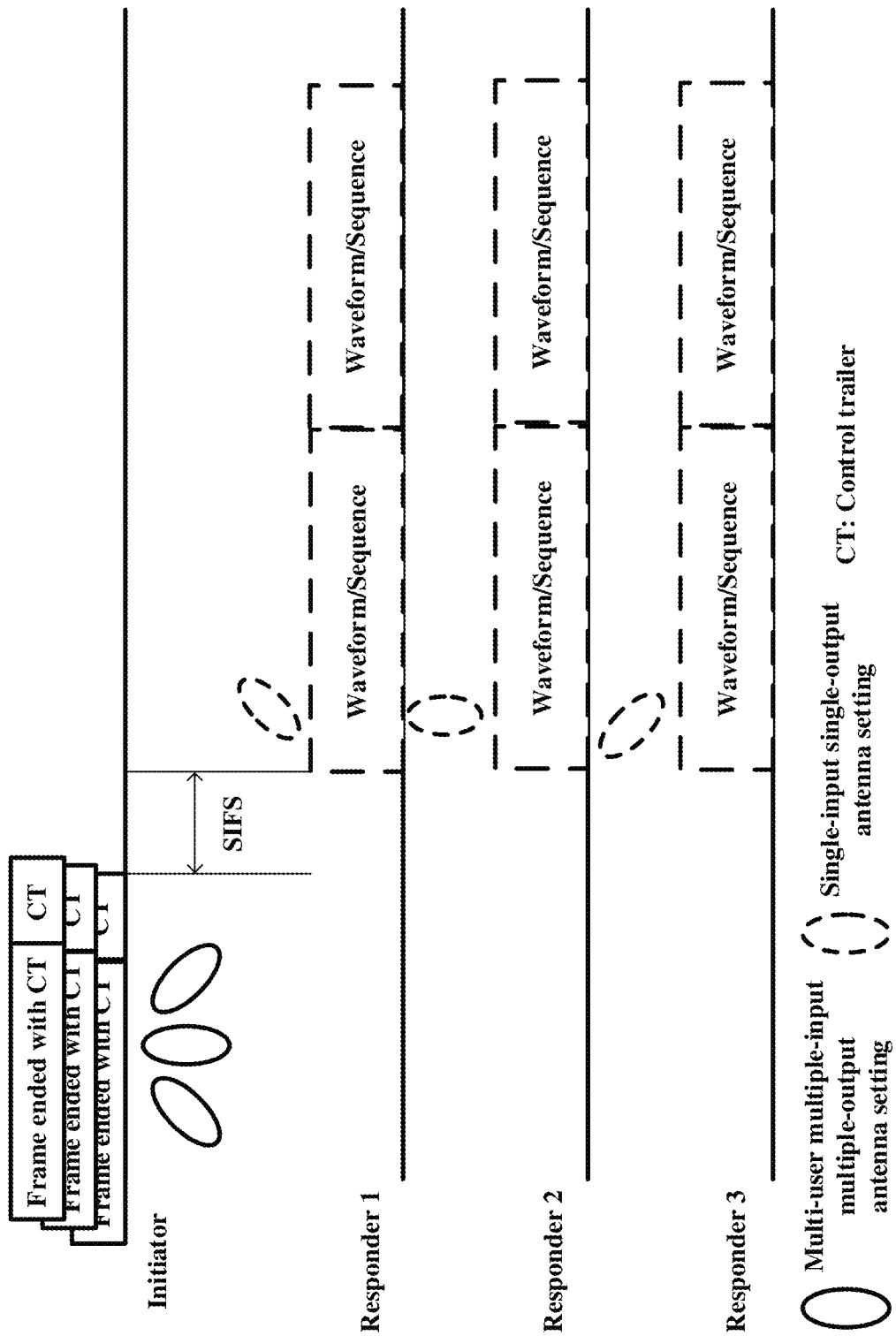
FIG. 8 is a schematic diagram of implementing a multi-user sensing procedure by using a newly defined CT type according to an embodiment.

A procedure is shown in FIG. 8. In a high-frequency scenario, the first network device (represented as an initiator in the figure) sends a frame carrying a control trailer (represented as Frame ended with CT in the figure) to the plurality of second network devices (represented as responders in the figure). The CT is a newly defined CT type or a CT type obtained by modifying a reserved bit in an existing CT of another type. The CT includes the indication information that indicates the second network device to send the sensing signal. The indication information includes information corresponding to the plurality of second network devices, such as waveforms/sequences to be transmitted, sending directions of beams, and a quantity of repetition times of sending waveforms/sequences. The indication information may include an optional field, such as a sensing indication field, a waveform or sequence set identifier field, and a direction identifier field, and may further include an optional field, such as a waveform or sequence identifier field, or a repetition field. A waveform or sequence set indicated by the waveform or sequence set identifier field includes a waveform or sequence indicated by the waveform or sequence identifier field. After receiving the indication information, the second network device directly sends the sensing signal after an SIFS. The sensing signal is represented as a waveform or sequence with orthogonality. Then, the first network device receives the sensing signals sent by the plurality of second network devices and performs sensing.

It can be understood that in this embodiment, a new type of sensing frame is defined by using a newly defined CT type or by modifying a reserved bit in an existing CT of another type, for example, by modifying a reserved part in a table of CT types shown in Table 3. A CT format type field value of the sensing frame is 4, and a remaining reserved part continues to be reserved. The field value 4 herein is merely an example and may be set based on an indicated entry. For example, the field value may be 3 bits or 5 bits.

The newly defined CT type is specially used to carry information that indicates the second network device to send high frequency sensing, and no MU MIMO-based channel access process is required. This indication manner is more flexible and is not limited to an application scenario of uplink multi-user wireless local area network sensing. In addition, an existing reserved bit is used in this manner, without adding new bits. Therefore, indication overheads are not increased.

It should be noted that this embodiment is described by using an example in which control information is in a CT. However, the scope of embodiments is not limited thereto. This embodiment may be applied to a scenario with multiple transmitting nodes or multiple measurement nodes.

TABLE 3

Table of control trailer (CT) types

| Control trailer type parameter value | Control trailer format type field value |
|---|---|
| Clear to send_Denial to send (CTS_DTS) | 0 |
| Grant_Request to send_Clear to send to self (GRANT_RTS_CTS2self) | 1 |
| Service period request (SPR) | 2 |
| Sector sweep feedback (SSW_FEEDBACK), block acknowledgment (BLOCK_ACK), or acknowledgment (ACK) | 3 |
| Sensing | 4 |
| Reserved | 5-15 |

The newly defined CT type may also include a field such as a sensing indication field, a waveform or sequence set identifier field, and a direction identifier field, and may further include an optional field such as a waveform or sequence identifier field and/or a repetition field. Descriptions corresponding to the fields are shown in Table 2. A frame structure of the field may be the same as that in FIG. 5, and details are not described again.

Embodiment 5

This embodiment describes a method for simultaneously performing wireless local area network sensing by multiple users by defining a wireless local area network sensing (WLAN Sensing) frame.

Figure 9:
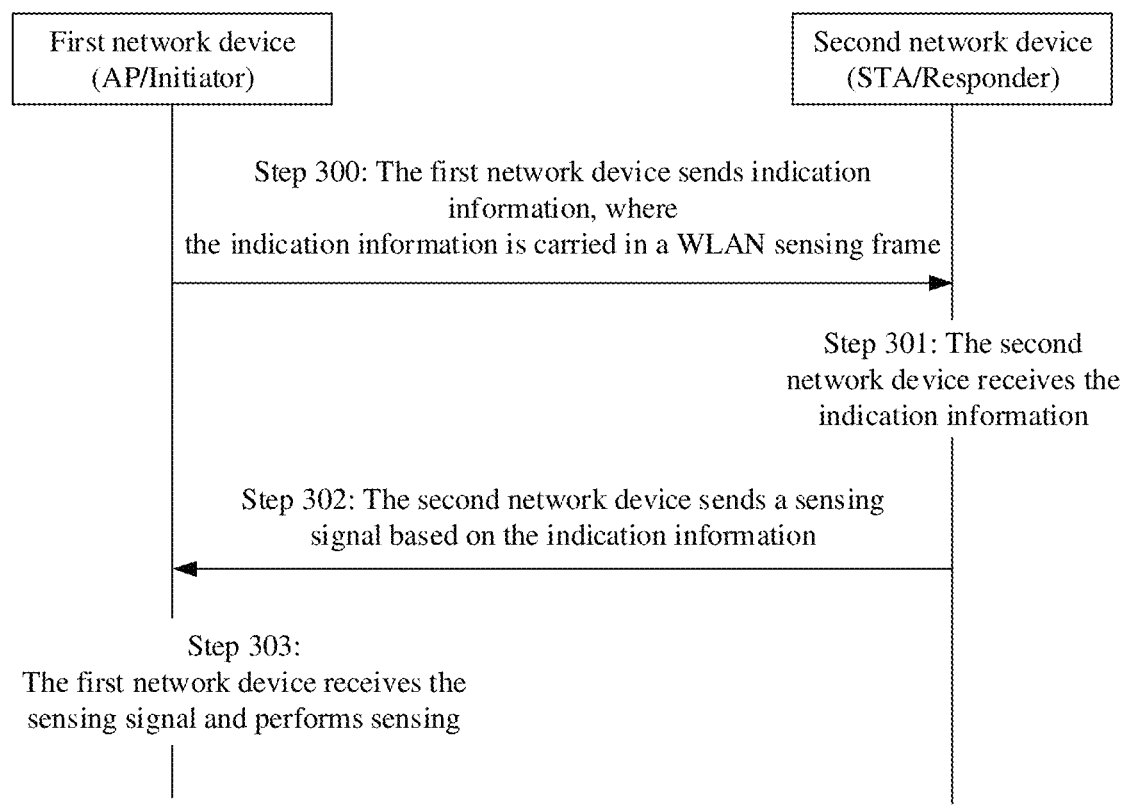
FIG. 9 is a schematic flowchart of a multi-user wireless local area network sensing method according to an embodiment.

As shown in FIG. 9, a multi-user wireless local area network sensing method may include the following steps.

Step 300: A first network device sends indication information to a plurality of second network devices, where the indication information indicates the plurality of second network devices to send sensing signals, and the indication information is carried in a WLAN sensing frame.

Step 301: The second network device receives the indication information sent by the first network device.

Step 302: The second network device sends the sensing signal based on the indication information.

Step 303: The first network device receives the sensing signal sent by the second network device and performs sensing.

Figure 10:
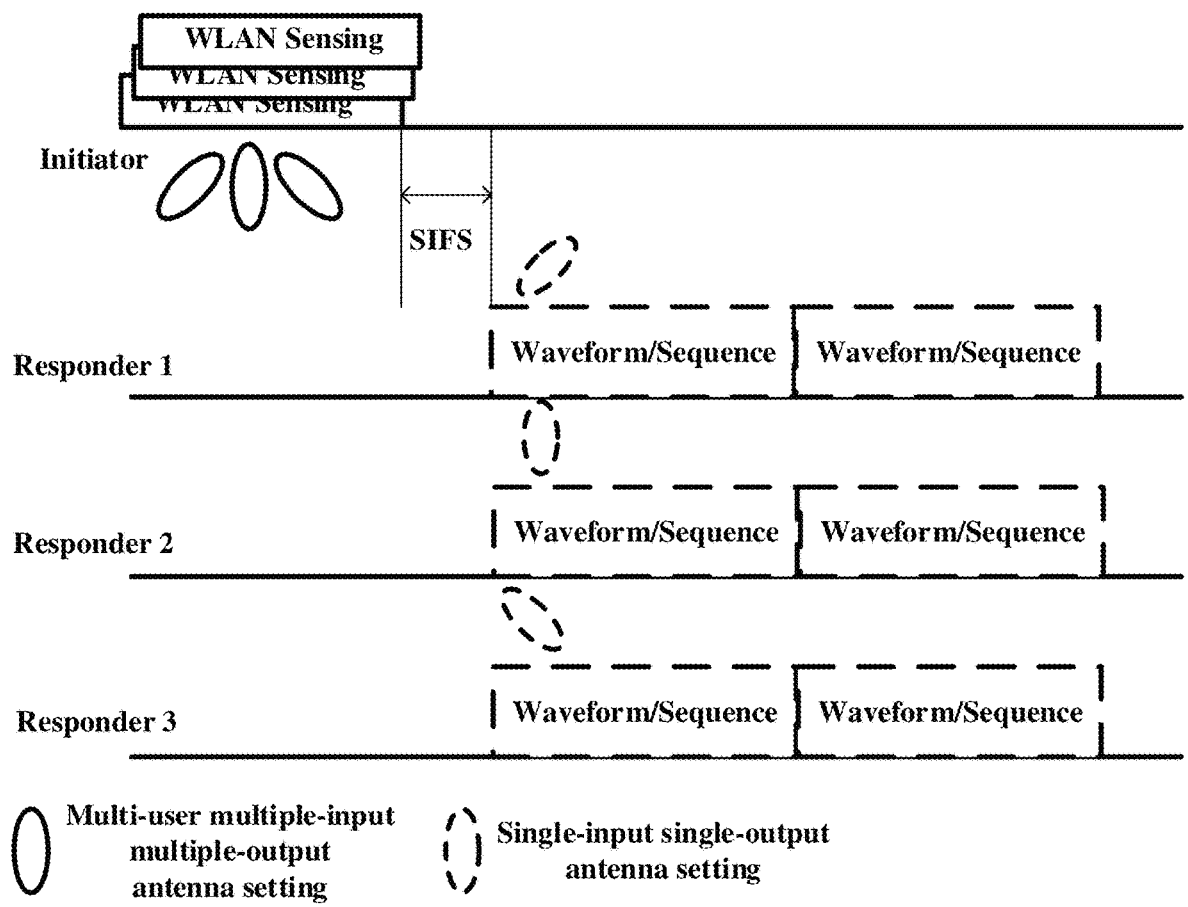
FIG. 10 is a schematic diagram of implementing a multi-user sensing procedure by using a newly defined sensing frame according to an embodiment.
Figure 11:
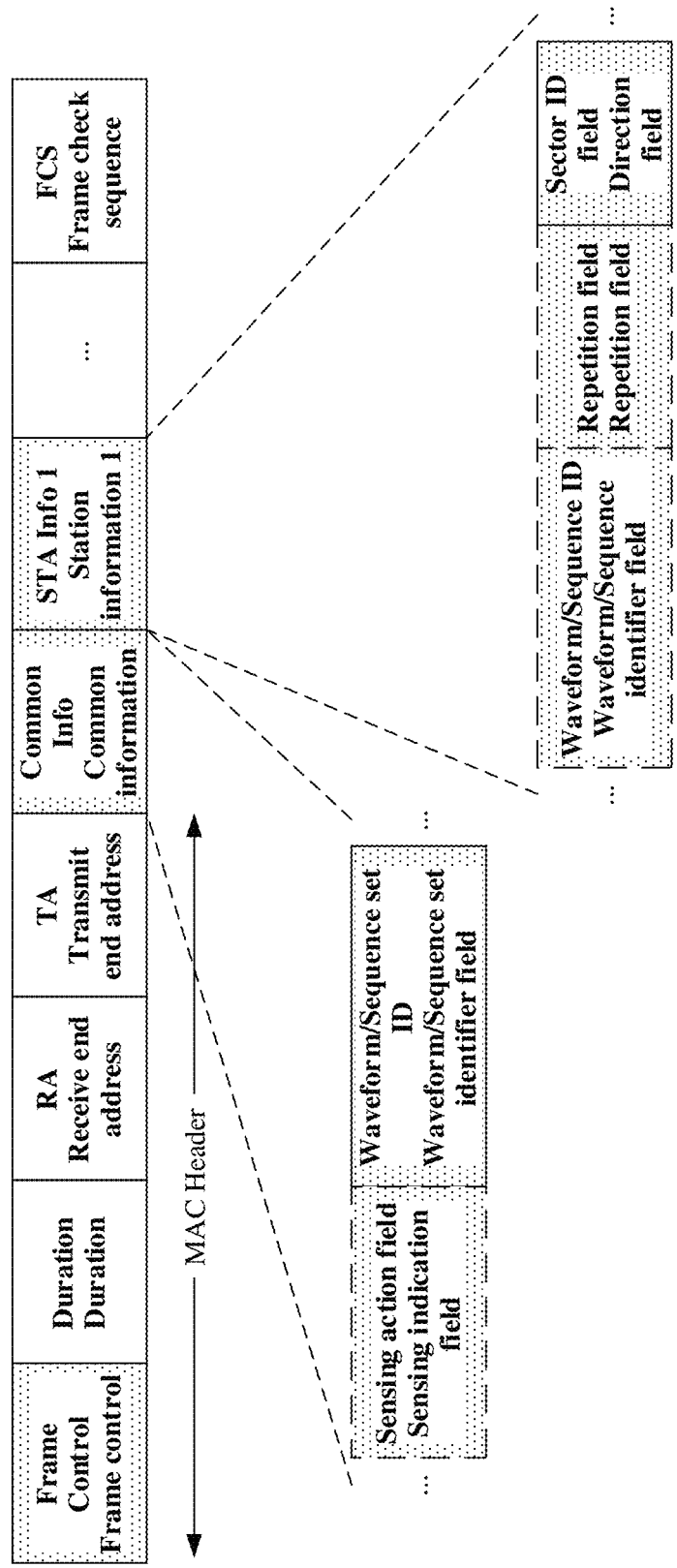
FIG. 11 is a schematic diagram of a frame structure of a newly defined sensing frame according to an embodiment.

A procedure is shown in FIG. 10. The first network device (represented as an initiator in the figure) sends the WLAN sensing frame (represented as WLAN Sensing in the figure) to the plurality of second network devices (represented as responders in the figure). The WLAN sensing frame is a newly defined frame. As shown in FIG. 11, the frame includes the indication information that indicates the second network device to send the sensing signal. The WLAN sensing frame may include but is not limited to a frame control field, a common information field, and a station information field. The common information field includes a field such as a waveform/sequence set identifier field. Optionally, the common information field further includes a sensing indication field. The station information field includes a direction identifier field. Optionally, the station information field further includes a waveform/sequence identifier field or a repetition field. A waveform/sequence set indicated by the waveform/sequence set identifier field includes a waveform/sequence indicated by the waveform/sequence identifier field. After receiving the indication information, the second network device directly sends the sensing signal after an SIFS. The sensing signal is represented as a waveform or sequence with orthogonality. Then, the first network device receives the sensing signals sent by the plurality of second network devices and performs sensing.

The WLAN sensing frame may include but is not limited to one or a combination of a frame control field, a duration field, a receive end address (RA), a transmit end address (TA), a common information field, a station information 1 field, and a frame check sequence (FCS) field shown in FIG. 11. The common information field includes but is not limited to one or a combination of a sensing indication field (sensing action field) and a waveform/sequence set identifier field (waveform/sequence set ID). The station information 1 field includes but is not limited to one or a combination of a waveform/sequence identifier field (waveform/sequence ID), a repetition field (repetition field), and a direction identifier field (sector ID field). The padded fields are newly added or improved fields in this embodiment.

The following describes the newly added or improved fields and their values. As shown in Table 4, the fields and their descriptions are as follows.

TABLE 4

Description of each field in a newly defined frame

| Field | Description |
|---|---|
| Frame control | Includes some control information of a media access control (MAC) frame, where the control information includes a type and a subtype of the MAC frame. The type and the subtype may indicate that the frame is a multi-user sensing (MU sensing) frame, to indicate each second network device to send a sensing signal. |
| Common information | Includes same configuration information of all stations, for example, configuration information that indicates each second network device to send a sensing signal, for example, information such as a channel for sending the sensing signal and a waveform/sequence set (descriptions of a sensing action field and a waveform/sequence set ID are the same as those of corresponding fields in Table 2, and details are not described again). Note: Some fields in the common information may also indicate that the frame is the MU sensing frame, to indicate each second network device to send the sensing signal. This is another indication solution in addition to the indication implemented by using the frame control. |
| Station information 1 | Includes different configuration information of each station, for example, a sequence that is sent, a quantity of repetition times, and a sending direction in Embodiment 1 (descriptions of a waveform/sequence ID field, a repetition field, and a sector ID field are the same as those of corresponding fields in Table 2, and details are not described again). |

FIG. 11 is a schematic diagram of a WLAN sensing frame. Fields of the WLAN sensing frame provided in this embodiment may alternatively have another combination or variation.

It can be understood that a new WLAN sensing frame is defined in this embodiment to indicate related sensing information sent by the second network device. The frame is implemented without depending on modification of a CT and has higher flexibility. In addition, the frame is not limited to a high frequency and uplink multi-user wireless local area network sensing scenario and is also applicable to a low frequency and downlink multi-user wireless local area network sensing scenario.

To implement functions in the foregoing methods provided in embodiments, the first network device and the second network device may include a hardware structure and a software module, to implement the foregoing functions in a form of the hardware structure, the software module, or a combination of the hardware structure and the software module. A function in the foregoing functions may be performed in a form of the hardware structure, the software module, or a combination of the hardware structure and the software module.

Figure 12:
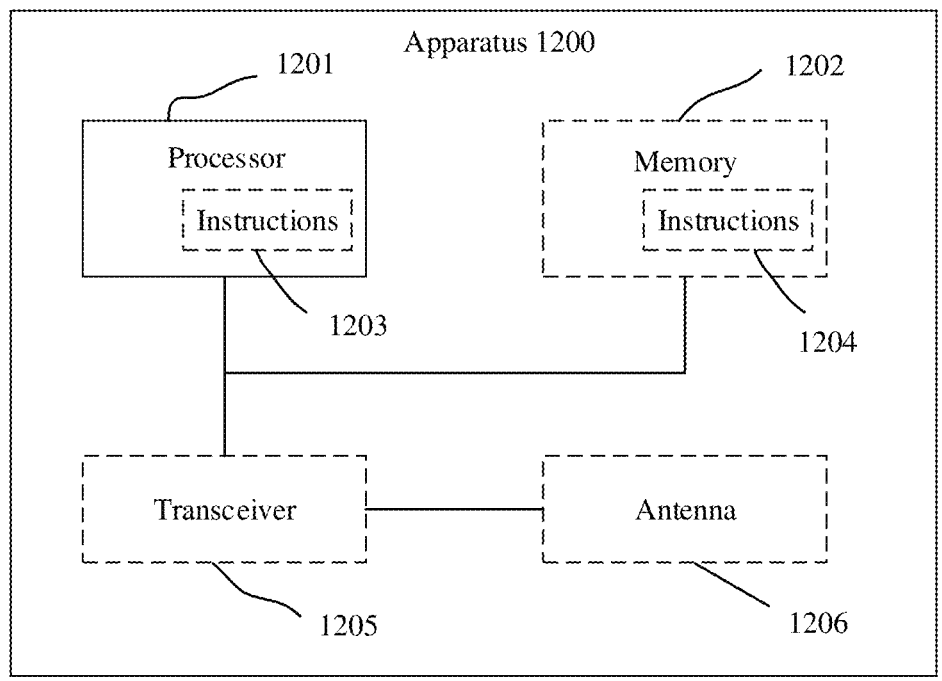
FIG. 12 is a schematic diagram depicting a structure of an apparatus according to an embodiment.

FIG. 12 is a schematic diagram depicting a structure of an apparatus according to an embodiment. The apparatus may be configured to implement the methods described in Embodiments 1 to 5. For details, refer to the descriptions in Embodiments 1 to 5.

The apparatus may include one or more processors 1201. The processor 1201 may also be referred to as a processing unit and can implement functions of the network device or the terminal device in the methods provided in embodiments. The processor 1201 may be a general-purpose processor, a dedicated processor, or the like.

The processor 1201 may alternatively store instructions and/or data 1203, and the instructions and/or data 1203 may be run by the processor, to enable the apparatus 1200 to perform the methods described in the foregoing method embodiments.

The processor 1201 may include a communication unit configured to implement a receiving and sending function. For example, the communication unit may be a communication interface, a transceiver circuit, an interface, or an interface circuit. The processor 1201 may implement, by using the communication unit, the method performed by the network device or the method performed by the terminal device in the methods provided in embodiments.

Optionally, the apparatus 1200 may include one or more memories 1202, and the memory 1202 may store instructions 1204. The instructions may be run on the processor, to enable the apparatus 1200 to perform the methods described in the foregoing method embodiments. Optionally, the memory may further store data. Optionally, the processor may also store instructions and/or data. The processor and the memory may be separately disposed or may be integrated together.

Optionally, the apparatus 1200 may further include a transceiver 1205 and an antenna 1206. The processor 1201 may be referred to as a processing unit and controls the apparatus 1200. The transceiver 1205 may be referred to as a communication interface, a communication unit, a transceiver machine, a transceiver circuit, a transceiver, or the like, and is configured to implement a receiving and sending function.

The apparatus may be a first network device, or may be a component (for example, an integrated circuit or a chip) of the first network device. The apparatus may alternatively be another communication unit, configured to implement the methods in embodiments.

An apparatus 1200 may include:

a transceiver 1205, configured to: in a process in which a plurality of second network devices performs high frequency multiple-input multiple-output MIMO channel access, send indication information to the second network device, where the indication information indicates the plurality of second network devices to send uplink sensing signals; and the transceiver 1205 is further configured to receive the uplink sensing signals sent by the plurality of second network devices; and a processor 1201, configured to perform uplink sensing based on the uplink sensing signal sent by the second network device.

The apparatus 1200 provided in this embodiment can implement the method in any one of Embodiment 1 to Embodiment 3, and effects that can be achieved are described in Embodiment 1 to Embodiment 3. Details are not described herein again.

An apparatus 1200 may include:

a transceiver 1205, configured to send indication information to a plurality of second network devices working at a high frequency, where the indication information indicates the plurality of second network devices to send sensing signals, and the indication information is carried in control information corresponding to a frame sent by the transceiver to the second network device; and the transceiver 1205 is further configured to receive the sensing signal sent by the second network device; and a processor 1201, configured to sense a received sensing signal.

The apparatus 1200 provided in this embodiment can implement the method in Embodiment 4, and an effect that can be achieved is described in Embodiment 4. Details are not described herein again.

An apparatus 1200 may include:

a transceiver 1205, configured to send indication information to a plurality of second network devices, where the indication information indicates the plurality of second network devices to send sensing signals, and the indication information is carried in a wireless local area network sensing (WLAN sensing) frame sent by the transceiver to the second network device; and the transceiver 1205 is further configured to receive the sensing signal sent by the second network device; and a processor 1201, configured to sense a received sensing signal.

The apparatus 1200 provided in this embodiment can implement the method in Embodiment 5, and an effect that can be achieved is described in Embodiment 5. Details are not described herein again.

The apparatus 1200 may be a second network device, or may be a component (for example, an integrated circuit or a chip) of the second network device. The apparatus may alternatively be another communication unit, configured to implement the methods in embodiments.

An apparatus 1200 may include:

a transceiver 1205, configured to receive indication information in a high frequency multiple-input multiple-output MIMO channel access process, where the indication information indicates the transceiver to send an uplink sensing signal; and a processor 1201, configured to identify the indication information.

The transceiver 1205 is further configured to send the uplink sensing signal based on the indication information.

The apparatus 1200 provided in this embodiment can implement the method in any one of Embodiment 1 to Embodiment 3, and effects that can be achieved are described in Embodiment 1 to Embodiment 3. Details are not described herein again.

An apparatus 1200 may include:

a transceiver 1205, configured to receive indication information when working at a high frequency, where the indication information indicates the communication unit to send a sensing signal, and the indication information is carried in control information corresponding to a frame received by the transceiver from a first network device; and a processor 1201, configured to identify the indication information.

The transceiver 1205 is further configured to send the sensing signal based on the indication information.

The apparatus 1200 provided in this embodiment can implement the method in Embodiment 4, and an effect that can be achieved is described in Embodiment 4. Details are not described herein again.

An apparatus 1200 may include:
a transceiver 1205, configured to receive indication information, where the indication information indicates the transceiver to send a sensing signal, and the indication information is carried in a wireless local area network sensing (WLAN sensing) frame received by the transceiver from a first network device; and
a processor 1201, configured to identify the indication information.

The transceiver 1205 is further configured to send the sensing signal based on the indication information.

The apparatus 1200 provided in this embodiment can implement the method in Embodiment 5, and an effect that can be achieved is described in Embodiment 5. Details are not described herein again.

It may be understood that, in some scenarios, some optional features in the embodiments may be independently implemented without depending on another feature, for example, a solution on which the optional features are currently based, to resolve a corresponding problem and achieve a corresponding effect. Alternatively, in some scenarios, the optional features are combined with other features based on requirements. Correspondingly, the apparatus provided in this embodiment may also correspondingly implement these features or functions. Details are not described herein.

In the embodiments, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams included in the embodiments. The general-purpose processor may be a microprocessor, any conventional processor, or the like. The steps of the method included with reference to the embodiments may be directly performed by a hardware processor or may be performed by using a combination of hardware in the processor and a software module.

In the embodiments, the memory may be a nonvolatile memory, such as a hard disk drive (HDD) or a solid-state drive (SSD), or may be a volatile memory, such as a random access memory (RAM). The memory is any other medium that can carry or store expected program code in a form of an instruction structure or a data structure and that can be accessed by a computer, but is not limited thereto. The memory in the embodiments may alternatively be a circuit or any other apparatus that can implement a storage function and is configured to store program instructions and/or data.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer instructions are loaded and executed on a computer, all or a part of the procedures or functions according to the embodiments are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The foregoing descriptions are merely implementations, but are not intended to limit the scope of the embodiments. Any variation or replacement readily figured out by a person skilled in the art shall fall within the scope of the embodiments.

What is claimed is:

1. An uplink multi-user wireless local area network sensing method, comprising:
    sending, by a first network device, indication information to a plurality of second network devices in a process in which the plurality of second network devices performs high frequency multiple-input multiple-output (MIMO) channel access, wherein the indication information indicates the plurality of second network devices to send uplink sensing signals;
    receiving, by the first network device, the uplink sensing signals from the second network devices; and
    performing, by the first network device, uplink sensing;
    wherein the indication information is a predefined bit in a control trailer field; and
    the predefined bit comprises a sensing indication field, a waveform or sequence set identifier field, and a direction identifier field.

2. The uplink multi-user wireless local area network sensing method according to claim 1, wherein
    the indication information is carried in control information corresponding to a request to send (RTS) frame which is sent by the first network device to the second network device.

3. The uplink multi-user wireless local area network sensing method according to claim 1, wherein
    the indication information is carried in control information corresponding to a directional multi-gigabit clear to send to self (DMG CTS-to-self) frame which is sent by the first network device to the second network device.

4. The uplink multi-user wireless local area network sensing method according to claim 1, wherein the predefined bit further comprises a waveform or sequence identifier field, or a repetition field.

5. The uplink multi-user wireless local area network sensing method according to claim 4, wherein a waveform or sequence set indicated by the waveform or sequence set identifier field comprises a waveform or sequence indicated by the waveform or sequence identifier field.

6. The uplink multi-user wireless local area network sensing method according to claim 1, wherein the uplink sensing signals from the second network devices are sent simultaneously.

7. The uplink multi-user wireless local area network sensing method according to claim 1, wherein the indication information is sent in a wireless local area network sensing (WLAN sensing) frame;
    the WLAN sensing frame indicated related sensing information sent by the plurality of second network devices; and the WLAN sensing frame is implemented independent of modification to the control trailer field.

8. A first network device for uplink multi-user wireless local area network sensing, comprising:
a transceiver, configured to:
send indication information to a plurality of second network devices in a process in which the plurality of second network devices performs high frequency multiple-input multiple-output (MIMO) channel access, wherein the indication information indicates the plurality of second network devices to send uplink sensing signals; and
receive the uplink sensing signals from the plurality of second network devices; and
a processor, configured to perform uplink sensing based on the uplink sensing signals;
wherein the indication information is a predefined bit in a control trailer field; and
the predefined bit comprises a sensing indication field, a waveform or sequence set identifier field, and a direction identifier field.

9. The first network device according to claim 8, wherein the indication information is carried in control information corresponding to a request to send (RTS) frame which is sent by the transceiver to the second network device.

10. The first network device according to claim 8, wherein the indication information is carried in control information corresponding to a directional multi-gigabit clear to send to self (DMG CTS-to-self) frame which is sent by the transceiver to the second network device.

11. The first network device according to claim 8, wherein the predefined bit further comprises a waveform or sequence identifier field, or a repetition field.

12. The first network device according to claim 11, wherein a waveform or sequence set indicated by the waveform or sequence set identifier field comprises a waveform or sequence indicated by the waveform or sequence identifier field.

13. The first network device according to claim 8, wherein the uplink sensing signals from the second network devices are sent simultaneously.

14. The first network device according to claim 8, wherein the indication information is sent in a wireless local area network sensing (WLAN sensing) frame;
the WLAN sensing frame indicated related sensing information sent by the plurality of second network devices; and
the WLAN sensing frame is implemented independent of modification to the control trailer field.

15. A chip, comprising at least one processor and an interface, wherein
the interface is configured to: output indication information to a plurality of second network devices in a process in which the plurality of second network devices performs high frequency multiple-input multiple-output (MIMO) channel access, wherein the indication information indicates the plurality of second network devices to send uplink sensing signals;
the interface is further configured to input the uplink sensing signals received from the plurality of second network devices; and
the processor is configured to perform uplink sensing based on the uplink sensing signals;
wherein the indication information is a predefined bit in a control trailer field; and
the predefined bit comprises a sensing indication field, a waveform or sequence set identifier field, and a direction identifier field.

16. The chip according to claim 15, wherein the indication information is carried in control information corresponding to a request to send (RTS) frame which is sent by the interface to the second network device.

17. The chip according to claim 15, wherein the indication information is carried in control information corresponding to a directional multi-gigabit clear to send to self (DMG CTS-to-self) frame which is sent by the interface to the second network device.

18. The chip according to claim 15, wherein the predefined bit further comprises a waveform or sequence identifier field, or a repetition field, wherein a waveform or sequence set indicated by the waveform or sequence set identifier field comprises a waveform or sequence indicated by the waveform or sequence identifier field.

19. The chip according to claim 15, wherein the uplink sensing signals from the second network devices are sent simultaneously.

20. The chip according to claim 15, wherein the indication information is sent in a wireless local area network sensing (WLAN sensing) frame;
the WLAN sensing frame indicated related sensing information sent by the plurality of second network devices; and
the WLAN sensing frame is implemented independent of modification to the control trailer field.

* * * * *